(12) United States Patent
Nishio et al.

(10) Patent No.: US 7,452,167 B2
(45) Date of Patent: Nov. 18, 2008

(54) CUTTING INSERT AND MILLING TOOL

(75) Inventors: Mitsuhiro Nishio, Higashiomi (JP);
Kaoru Hatta, Higashiomi (JP);
Yoshihide Kojima, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 449 days.

(21) Appl. No.: 11/173,950

(22) Filed: Jun. 30, 2005

(65) Prior Publication Data
US 2006/0115340 A1 Jun. 1, 2006

(30) Foreign Application Priority Data
Nov. 26, 2004 (JP) .......................... P2004-342340

(51) Int. Cl.
*B23C 5/00* (2006.01)
*B23C 5/20* (2006.01)

(52) U.S. Cl. ....................................... 407/113; 407/114

(58) Field of Classification Search ................. 407/113, 407/114, 115, 116, 117
See application file for complete search history.

(56) References Cited

U.S. PATENT DOCUMENTS

| | | | |
|---|---|---|---|
| 5,052,863 A | 10/1991 | Satran | |
| 5,071,292 A | 12/1991 | Satran | |
| 5,951,212 A * | 9/1999 | Emoto et al. | ................. 407/114 |
| 6,543,970 B1 * | 4/2003 | Qvarth et al. | ................ 407/114 |
| 6,769,844 B2 * | 8/2004 | Waggle | ...................... 407/114 |

FOREIGN PATENT DOCUMENTS

| | | |
|---|---|---|
| JP | 02-298415 | 12/1990 |
| JP | 03-085686 | 4/1991 |
| JP | 2004517739 A | 6/2004 |
| WO | 02055245 A1 | 7/2002 |

OTHER PUBLICATIONS

Japanese language office communication and its English translation for corresponding Japanese application 2004-342340 lists the reference above.

* cited by examiner

*Primary Examiner*—Dana Ross
(74) *Attorney, Agent, or Firm*—Hogan & Hartson LLP

(57) ABSTRACT

A milling tool includes a cutting tool insert, roughly plate-shaped and having a rake face on an upper face and a flank on a side face and a main cutting edge at an intersection ridge line part at the intersection of the rake face and the flank, fitted in the periphery of a substantially cylindrical holder removably and so that an axial rake angle of the cutting edge ridge line of the main cutting edge is positive. When the cutting tool insert is rotated about the axis of rotation of the holder, the shape of the locus of rotation of the main cutting edge in a section parallel to the axis of rotation is made an approximate circular arc shape swelling outward with progress from the ends to the center.

6 Claims, 18 Drawing Sheets

CUTTING INSERT AND MILLING TOOL

BACKGROUND OF THE INVENTION

1. Field of the Invention

The present invention relates to a milling tool used as a rotating bit in a machine tool such as a machining center.

2. Description of the Related Art

There has been known end mills in which a cutting insert having a shape of an approximate parallelogram is fitted into a tip part of a holder used as a rotating tool in machining with machine tools such as machining centers. The cutting insert is fitted into the holder so that a long side is disposed at the periphery of the end mill as a main cutting edge, a short side is disposed at the tip of the end mill as a flat cutting edge, and the main cutting edge slants at an angle, called the axial rake angle, to the axis of rotation of the holder.

Conventionally, a cutting insert in a plan view of which a main cutting edge is formed in a straight line have been used. However, when the cutting insert is fitted in a holder with an axial rake angle as described above and shoulder work is carried out, the machined wall face is not flat and becomes a convexly curved face swelling outward with progress from the sides toward the center so that the part machined with the central vicinity of the main cutting edge projects slightly outward. In machining where flatness is important, the machined wall face becoming a convexly curved face projecting with progress from the sides to the center like this not only impairs the quality of the appearance of the product, but also, because a re-finishing step becomes necessary, entails excessive machining time and machining cost, and has been problematic from the point of view of machining efficiency.

In this connection, to resolve this problem and obtain a smooth machined surface, in Japanese Examined Patent Publication JP-B2 3085686 it is disclosed that in a plan view of a cutting insert itself a main cutting edge swells outward, thereby it is made possible to form into a straight line a sectional form of a locus of rotation of the main cutting edge of the end mill which is cut by an imaginary plane which includes an axis of rotation and is parallel therewith and therefore a machined wall face after machining can be formed to be not so uneven.

However, when a milling tool fitted with a cutting insert whose main cutting edge swells as disclosed in Japanese Examined Patent Publication No. 3085686 is used, although when the dimensions of the cutting insert are accurately controlled and the cutting insert is mounted to the holder properly it is possible to control the locus of rotation of the main cutting edge to an accurate cylindrical shape right to the cutting edge ends, in practice, due to variation of the fitting accuracy between the holder and the cutting insert and variation of dimensional accuracy, a difference often arises between the turning radii of the ends of the main cutting edge of the cutting insert fitted in the holder, and there has been the problem that when multi-cut machining in shoulder work or grooving work is carried out in this state, large steps are formed at the joins between passes in the machining of multiple passes in the machined surface. And, in practice bending of the holder occurs during machining due to cutting load, and in this case, even if the cutting insert was mounted in a position such that the locus of rotation assumes the ideal cylindrical surface shape, steps will be still formed in the machined wall face. That is, obtaining a machined face with absolutely no steps has been, in practice, almost impossible.

SUMMARY OF THE INVENTION

The invention has been made to solve these kinds of problems of related art, and an object of the invention is to provide a milling tool with which, in cutting work it is possible to make small steps, i.e., unevenness, in a machined wall face of a workpiece that arise due to multi-cut machining in shoulder-cutting and grooving work, and machine a product with a machined wall face with a higher machined face roughness all the way from one end to the other end of the cutting edge.

To solve the problems mentioned above, the invention provides a cutting insert to be fitted to a substantially cylindrical milling tool holder, comprising a substantially plate-shaped insert body, a rake face formed on an upper face of the insert body, a flank formed on a side face of the insert body, and a main cutting edge at an intersection ridge line part between the intersection of the rake face and the flank, wherein when the holder is rotated around a center of axis while the cutting insert is fitted in the circumferential periphery of the milling tool holder, of a locus of rotation of the main cutting edge, a middle part in the holder axial direction projects further outward in the holder radial direction than end parts in the holder axial direction.

According to the invention, a milling tool having a main cutting edge at its periphery is formed by the cutting insert being fitted to the milling tool holder. The milling tool discretely intermittently cuts a workpiece to make a grooving or shoulder cutting by making contact with the workpiece while rotating about its axis. In addition, it is possible to increase a depth from a surface to a machined bottom face of the workpiece by carrying out so-called multi-cut machining, in which a workpiece is cut at multiple different levels in the holder axial direction.

In the invention, a middle part of the main cutting edge in the holder axial direction projects further outward, in the holder radial direction than end parts of the main cutting edge in the holder axial direction. In other words, the holder axial direction end parts of the main cutting edge are more inward than the holder axial direction middle part with respect to the locus of rotation of the main cutting edge.

It is difficult to eliminate a difference in the holder radial direction between distances from the axis of the holder to the holder axial direction end parts of the main cutting edge caused by a dimensional error of the cutting insert, mounting error of the cutting insert to the holder, or bending of the holder. When there is a difference in the holder radial direction between distances from the axis of the holder to the holder axial direction end parts of the main cutting edge, compared to the case where the difference in the holder radial between distances from the axis of the holder to the holder axial direction end parts of the main cutting edge is zero, amount of overcutting is small at one of the holder axial direction end parts of the main cutting edge an un-cut part arises, and large at the other. Herein an amount of overcutting means a depth of insertion of the cutting edge into a workpiece by overcutting in a direction perpendicular to the axis of rotation of the holder. When the amount of overcutting is small, cutting amount of a workpiece by the main cutting edge is small in the direction perpendicular to the axis of rotation of the holder. When the amount of overcutting is large, cutting amount of a workpiece by the main cutting edge is large in the direction perpendicular to the axis of rotation of the holder.

According to the invention, by multi-cut machining being carried out, the holder axial direction middle part of the main cutting edge can cut away any part to be cut of a workpiece which has undergone insufficient cutting caused by either of the holder axial direction end parts of the main cutting edge. Accordingly, it is possible to reduce the steps in the machined wall face formed due to a difference in the holder radial direction between distances from the axis of the holder to the holder axial direction end parts of the main cutting edge and thereby make the machined wall face even. And it is possible to make small the influence of the above-mentioned difference in the holder radial direction between the holder axial direction end parts of the main cutting age, on the machined surface roughness of the machined wall face after cutting. Accordingly it is possible to reduce the steps in the machined wall face which may arise at the joins between cutting passes, and the machined surface roughness of the machined wall face after cutting can be improved. And the cutting insert can be used in the machining of materials where a machined wall face with a high machined surface roughness is required.

In the invention it is preferable that the sectional shape of the locus of rotation of the main cutting edge cut by an imaginary plane containing the axis of rotation is an approximate circular arc shape formed by the holder axial direction middle part swelling further outward in the holder radial direction than the holder axial direction end parts.

According to the invention, most of the un-cut part of the workpiece formed by the holder axial direction tip end part of the main cutting edge in a previous cutting operation of a relatively small cutting amount can be cut by the holder axial direction middle part of the main cutting edge, and the machined surface roughness of the machined wall face after cutting can be improved further.

In the invention it is preferable that the amount of holder radial direction swell w of the locus of rotation of the main cutting edge from the holder axial direction end parts to that portion of the holder axial direction middle part which projects farthest out in the holder radial direction is 0.02 mm or more and 0.06 mm or less.

When the amount of swell w in the holder radial direction is less than 0.02 mm it is not possible to absorb variation of the main cutting edge position, that is, differences in the holder radial direction between distances from the axis of the holder to the holder axial direction end parts of the main cutting edge, arising when the cutting insert is fitted to the holder, and the steps in the machined wall face become large. And when the holder radial direction swell w exceeds 0.06 mm, the machined wall face becomes too concave and the steps in the machined wall face become large as a result of that.

With respect to this, in the invention, as a result of the radial direction swell amount w being 0.02 mm or More and 0.06 mm or less, the difference in the holder axial direction between distances from the axis of the holder to the holder axial direction end parts of the main cutting edge can be absorbed without the radial direction swell w becoming too large. Accordingly it is possible to make small the steps in the machined wall face and stably obtain a high-quality machined wall face.

Furthermore, in the invention it is preferable that, of the locus of rotation of the main cutting edge, the holder axial direction center part projects farthest outward in the holder radial direction.

In this case, whether the holder axial direction tip end part of the main cutting edge projects further outward in the holder radial direction than the holder axial direction base end part or the holder axial direction base end part projects further outward in the holder radial direction than the holder axial direction tip end part, in either case the machined surface roughness of the machined wall face can be prevented from becoming high. This is particularly useful in cases where it is not possible to ascertain which of the holder tip end part and the holder base end part of the main cutting edge is positioned further outward in the holder radial direction.

Furthermore, in the invention it is preferable that of the holder axial direction middle part of the locus of rotation of the main cutting edge, a holder tip end side portion may project farthest outward in the holder radial direction.

During cutting, when the holder tip end part bends with respect to the holder base end part away from the workpiece, at the location in contact with the workpiece, the holder axial direction tip end part of the main cutting edge withdraws from the workpiece in the holder radial direction to inward of the holder axial direction base end part of the main cutting edge.

According to the invention, compared to the rest of the main cutting edge, a holder tip end side portion of the holder axial direction middle part of the main cutting edge projects farthest outward in the holder radial direction. Accordingly, even when the holder bends during cutting, the projection amount by which the holder axial direction base end part of the main cutting edge projects further outward in the holder radial direction than the holder axial direction tip end part of the main cutting edge can be made small. Therefore, the affect of bending of the holder can be reduced, and the machined surface roughness of machined wall faces of the workpiece can be improved.

Furthermore, in the invention, it is preferable that the cutting insert has a bottom face that abuts with a seat face of the milling tool holder when the cutting insert is fitted to the milling tool holder, and the main cutting edge slopes toward this bottom face with progress from the holder tip end part toward the holder base end part.

According to the invention, the main cutting edge is formed in a twisted shape having a twist angle. Accordingly, even when a degree of slope at which the seat face of the holder slopes with respect to the axis of the holder is small, a large axial rake can be provided. In this way it is possible to lower the cutting resistance encountered by the main cutting edge during cutting.

Furthermore, in the invention, it is preferable that the cutting insert has a corner R cutting edge continuous with the main cutting edge, and the radius of curvature r of this corner R cutting edge is 0.4 mm or more and 4.0 mm or less.

According to the invention, as well as chipping of the cutting insert being prevented, the steps in the machined wall face are made small and a high-quality machined surface is stably obtained.

Furthermore, in the invention, it is preferable that the cutting insert further has a flat cutting edge extending substantially perpendicularly to the main cutting edge.

According to the invention, a machined bottom face of the workpiece can be wiped by the flat cutting edge, and the milling tool made by the cutting insert being fitted to the holder can be realized as an end mill. Accordingly it is possible to perform groove-cutting work or shoulder-cutting work on the workpiece.

Furthermore, in the invention, it is preferable that the sectional shape of the locus of rotation of the main cutting edge cut by an imaginary plane containing the axis of rotation is an approximate circular arc shape formed by the holder axial direction middle part swelling further outward in the holder radial direction than the holder axial direction end parts, and the holder axial direction center part projects farthest outward in the holder radial direction.

According to the invention, most of a small cutting amount of a workpiece formed by the holder axial direction tip end part of the main cutting edge in a previous cutting operation can be cut by the holder axial direction middle part of the main cutting edge, and the machined surface roughness of the machined wall face after cutting can be improved further. Also, it is possible to prevent the machined surface roughness of the machined wall face after cutting from becoming high even when, of the holder axis direction end parts of the main cutting edge, either the holder tip end part or the holder base end part is positioned outward of the other in the holder radial direction.

Furthermore, in the invention, it is preferable that the sectional shape of the locus of rotation of the main cutting edge in an imaginary plane containing the axis of rotation is an approximate circular arc shape formed by the holder axial direction center part swelling further outward in the holder radial direction than the holder axial direction end parts, and when D (mm) is a holder machining diameter, L (mm) is a length of the straight line joining together the ends of the main cutting edge, $\theta$ (°) is an axial rake of the main cutting edge, and $X=(D-(D^2-L^2 \sin^2 \theta)^{1/2})/2$ is a maximum width (mm) between the straight line joining together the ends of the main cutting edge and an imaginary cylindrical surface the same diameter as the machining diameter of the holder outward of this straight line in the holder radial direction, then the amount of swell A (mm) of the center part of the main cutting edge with respect to the straight line joining the ends of the main cutting edge satisfies the following relationship $X+0.02 \leq A \leq X+0.06$.

According to the invention, even in the case of a milling tool of which the holder machining diameter, the size of the cutting insert (and particularly the main cutting edge), and the axial rake of the main cutting edge as of when the cutting insert is mounted to the holder all individually differ, the shape of the main cutting edge is optimized, and when multi-cut machining is carried out in shoulder-cutting work or groove-cutting work, the steps arising at the joins between passes as a result of the machining of multiple passes can be made small, and it is possible to obtain a high-quality machined surface with a high machined surface roughness.

The invention provides a milling tool comprising a cutting insert described above and a substantially cylindrical milling tool holder to a circumferential periphery of which the cutting insert can be removably fitted.

According to the invention, when the cutting insert is fitted to the milling tool holder, a holder axial direction middle part of the main cutting edge projects further outward in the holder radial direction than the holder axial direction end parts. Consequently, even if when the cutting insert is fitted to the milling tool holder a difference arises a difference in the holder radial direction between distances from the axis of the holder to the holder axial direction end parts of the main cutting edge between the holder radial direction positions of the holder axial direction end parts of the main cutting edge, when multi-cut machining is carried out in shoulder-cutting work or groove-cutting work, the steps forming at the joins between passes as a result of the machining of multiple passes can be made small. And the milling tool can be used in the machining of materials where a machined wall face with a high machined surface roughness is required.

Furthermore, in the invention, it is preferable that the cutting insert is fitted to the holder so that the axial rake of the main cutting edge is positive.

According to the invention, the cutting resistance applied to the main cutting edge by the workpiece can be made small, and cutting insert can be used in the machining of materials where a machined wall face with a high machined surface roughness is required.

Furthermore in the invention it is preferable that a plurality of the cutting inserts are fitted to the holder.

According to the invention, the cutting resistance encountered by each cutting insert can be reduced, and the possible depth of cut in the holder radial direction set for the milling tool can be increased. And as a result of the load applied to each cutting insert when the depth of cut has been made large being lowered, vibration and bending of the holder can be reduced and the machined wall face after cutting can be made smoother.

The invention also provides a milling tool of substantially cylindrical shape for cutting a workpiece, comprising a flank formed on an outer circumferential face of the milling tool, a rake face cut in from the flank, and a main cutting edge formed at an intersection ridge line part at the intersection of the rake face and the flank, and when the milling tool is rotated about its axis the tool axial direction middle part of the locus of rotation of the main cutting edge projects further outward in the tool radial direction than the tool axial direction end parts.

According to the invention, it is possible that by touching the workpiece as it rotates about its axis, the milling tool dicretely cuts the work piece to perform groove-cutting work and shoulder-cutting work. By so-called multi-cut machining, in which the workpiece is cut at multiple different levels in the holder axial direction from a surface of the workpiece, it is possible to achieve an increased depth of machining from a surface to a machined bottom of the workpiece.

In the invention, the tool axial direction middle part of the locus of rotation of the main cutting edge projects further outward in the tool radial direction than the tool axial direction end parts of the locus of rotation of the main cutting edge. Accordingly it is possible to obtain the same effects as those of the milling tool described earlier. That is, even if due to variation in the dimensional accuracy of the main cutting edge or bending of the holder a difference arises between distances from the axis of the tool to the axial direction end parts of the main cutting edge in the tool radial direction, a drop in machined surface roughness can be prevented. Accordingly it is possible to make small the steps in the machined wall face forming at the joins between cuts.

The invention also provides a method for cutting a wall face of a workpiece using a cutting insert according to the invention described above, the method comprising a mounting step of making a milling tool by fitting the cutting insert to the holder, an approach step of bringing the milling tool close to a workpiece, a cutting step of abutting the main cutting edge with a wall face of the workpiece while rotating the milling tool and thereby rotationally cutting the wall face of the workpiece, and a withdrawal step of moving the milling tool away from the workpiece.

According to the invention, in a mounting step a cutting insert is fitted to a milling tool holder to make a milling tool. Then, in an approach step the milling tool is brought close to a workpiece, in a cutting step the workpiece is cut with the milling tool, and in a withdrawal step the milling tool is moved away from the workpiece. By rotationally cutting a workpiece using a milling tool according to the invention like this, it is possible to obtain the effects explained above. That is, it is possible to improve the machined surface roughness of the machined wall face after cutting.

Furthermore, in the invention it is preferable that in the cutting step, the stage of rotationally cutting the wall face of the workpiece is performed a number of times, at different levels in the holder axial direction.

According to the invention, the steps arising at the joins between cuts can be made small, and the machined surface roughness of the machined wall face after cutting can be improved. And the milling tool can be used in the machining of materials where a machined wall face with a high machined surface roughness is required.

In the invention it is preferable that the method further comprises a step of, after the cutting step of rotationally cutting a wall face of the workpiece, rotationally finish-cutting the wall face of the workpiece with a milling tool for finishing, having a main cutting edge formed integrally with a circumferential periphery thereof.

According to the invention, rough cutting is carried out with a milling tool having a cutting insert, and a finishing cut is carried out with a milling tool for finishing. As described above, by using a cutting insert according to the invention it is possible to improve the machined surface roughness of a machined wall face after cutting in a rough-cutting stage, and it is possible to make the depth of cut in a finishing cut stage small. Accordingly the cutting time can be shortened. And even if the main cutting edge formed on the cutting insert breaks as a result of the depth of cut being made large at the time of rough cutting, it is possible to restore the sharpness of the milling tool by replacing the cutting insert.

BRIEF DESCRIPTION OF THE DRAWINGS

Other and further objects, features, and advantages of the invention will be more explicit from the following detailed description taken with reference to the drawings wherein.

DETAILED DESCRIPTION

Figure 1:
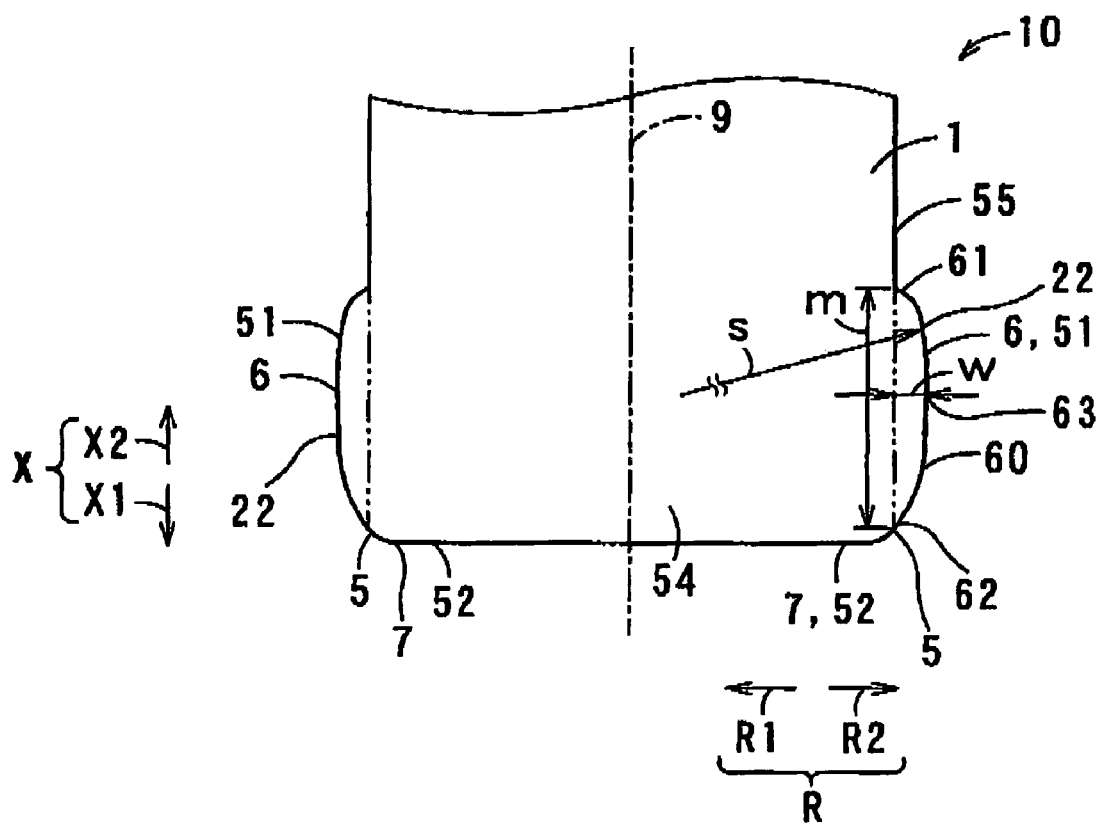
FIG. 1 is a view of an end mill according to a first embodiment of the invention being rotated about its axis of rotation, showing exaggerated the locus of rotation of a main cutting edge of the end mill in a section parallel to the axis of rotation.

Now referring to the drawings, preferred embodiments of the invention are described below.

Preferred embodiments of the invention will now be described with reference to the accompanying drawings.

Figure 2:
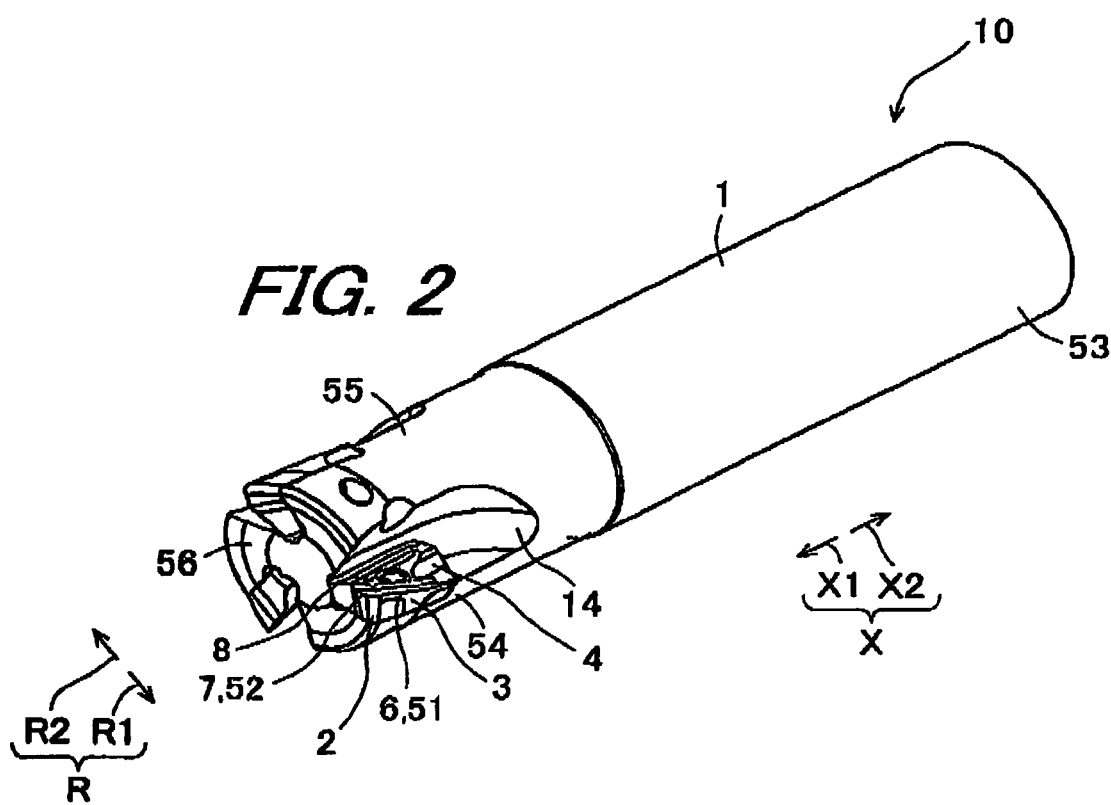
FIG. 2 is an overall perspective view of the end mill according to the first embodiment of the invention.
Figure 3:
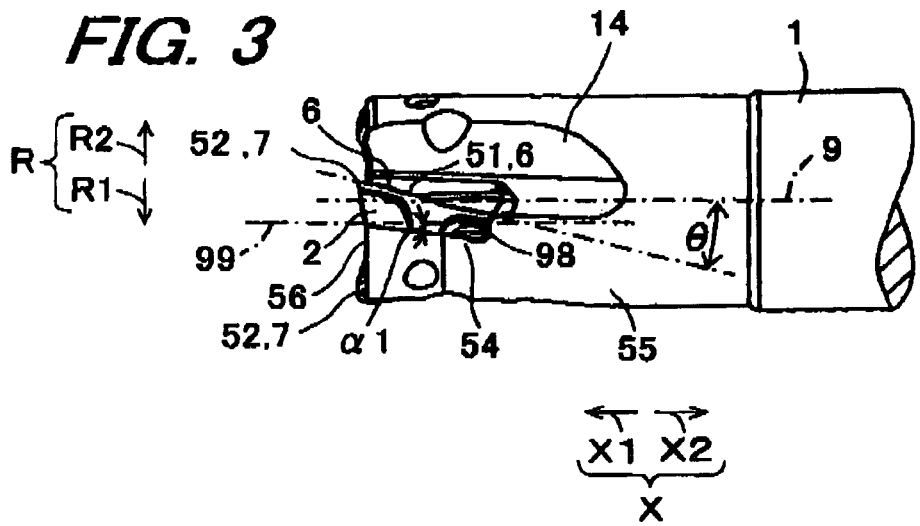
FIG. 3 is a side view of a detail of FIG. 2.

FIG. 1 is a view of an end mill 10 according to a first embodiment of the invention being rotated about its axis of rotation 9, showing exaggerated the locus of rotation of a main cutting edge 6 of the end mill 10 in a section parallel to the axis of rotation 9. FIG. 2 is an overall perspective view of an end mill 10 according to the first embodiment of the invention. FIG. 3 is a side view of a detail of FIG. 2.

An end mill 10 according to the first embodiment of the invention is a substantially cylindrical milling tool that has a main cutting edge 6 at its circumferential periphery and rotates about an axis of rotation 9. While the end mill 10 is rotated about the axis of rotation 9 by a milling machine or the like, the main cutting edge 6 makes contact with a workpiece and discretely cuts the workpiece. Accordingly it is possible to cut the workpiece to a predetermined shape.

The end mill 10 of this embodiment is made up of a cutting insert (hereinafter abbreviated to insert) 2 on which are formed a long-side cutting edge 51 constituting the main cutting edge 6 and a short-side cutting edge 52 constituting a flat cutting edge 7, and an end mill holder (hereinafter abbreviated to holder) 1 to which the insert 2 is removably fitted. In this embodiment the holder 1 is constructed so that a plurality of for example three inserts 2 can be fitted to it.

The holder 1 is formed in an approximately cylindrical shape. A chucking part to be held by arbors to a miller such as a milling center is formed at a base end part 53 of the holder 1. A fitting part to which the inserts 2 are fitted is formed at a tip end part 54 of the holder 1.

As shown in FIG. 2 and FIG. 3, when each insert 2 is fitted to the holder 1, the long-side cutting edge 51 of the insert 2 projects outward in the radial direction of the holder from the circumferential face 55 of the holder 1 to form the main cutting edge 6. And the short-side cutting edge 52 of the insert 2 projects outward in the holder axial direction from a tip end face 56 of the holder 1 to form the flat cutting edge 7.

As shown in FIG. 1, the main cutting edge 6 extends in the holder axial direction X of the holder 1 and projects from the circumferential face 55 of the holder 1 in the outward holder radial direction R2. When the end mill 10 rotates about the axis of rotation 9, the main cutting edge 6 describes a predetermined locus of rotation 22. Of this locus of rotation of the main cutting edge, a holder axial direction middle part 60 projects further in the outward holder radial direction R2 than holder axial direction end parts 61, 62.

As shown in FIG. 2 and FIG. 3, a channel is formed in the tip end part of the holder 1 coming in through the circumferential face and the tip end part end face of the holder 1. This channel is a space made up of an insert-receiving space and a chip pocket 14. The insert-receiving space is a space that receives almost all of the insert 2. The chip pocket 14 is a space for temporarily receiving chips produced by the cutting edges 51, 52 of the insert 2.

The fitting part of the holder 1 has a seat face 98 with which a bottom face of the insert 2 abuts and a wall face rising from the seat face 98. The seat face 98 angles in from the tip end face 56 of the holder 1 and extends in a back holder axial direction X2 toward the base end part 53, and also angles in from the circumferential face 55 of the holder 1 and extends in the inward holder radial direction R1. As shown in FIG. 3, with progress toward the base end part 53 the seat face 98 slopes at a predetermined slope angle α1 in the opposite direction to the rotation direction of the holder 1 with respect to a plane 99 parallel to the axis of rotation 9.

The insert 2 has its bottom face abutting with the seat face 98 of the holder 1 and has at least one of its side faces abutting with a wall face of the holder 1. In this state, the insert 2 is fixed to the holder 1 by a clamping member such as a screw member.

Figure 4:
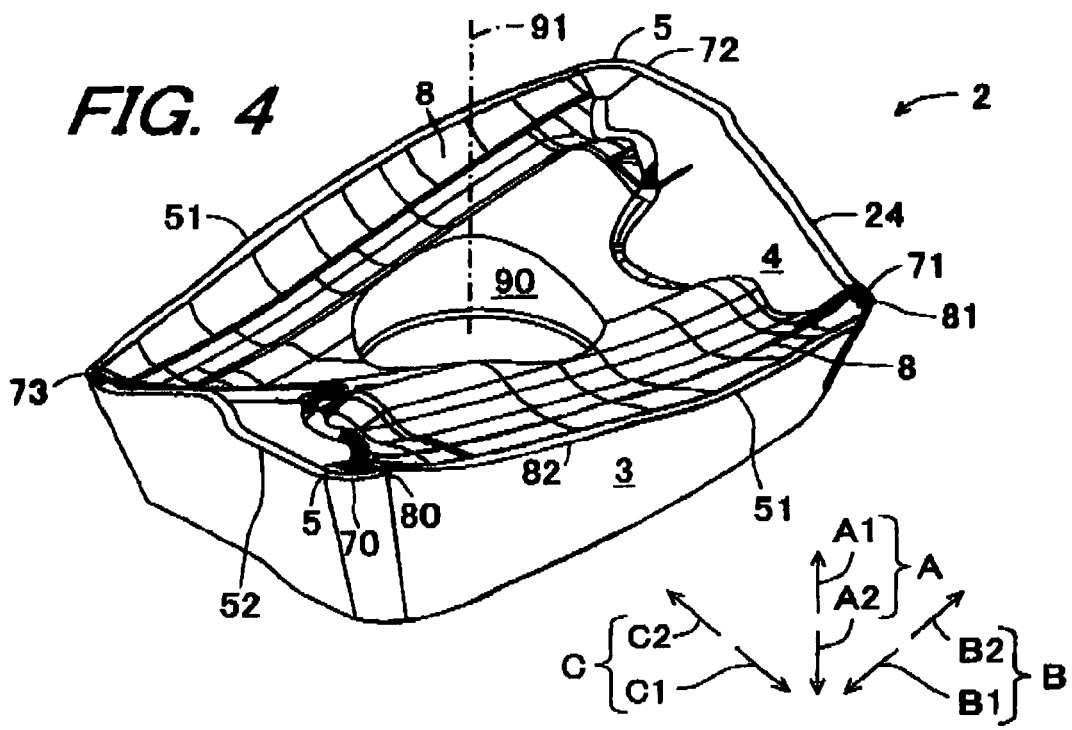
FIG. 4 is a perspective view showing partly exaggerated a cutting insert according to the first embodiment of the invention.
Figure 5:
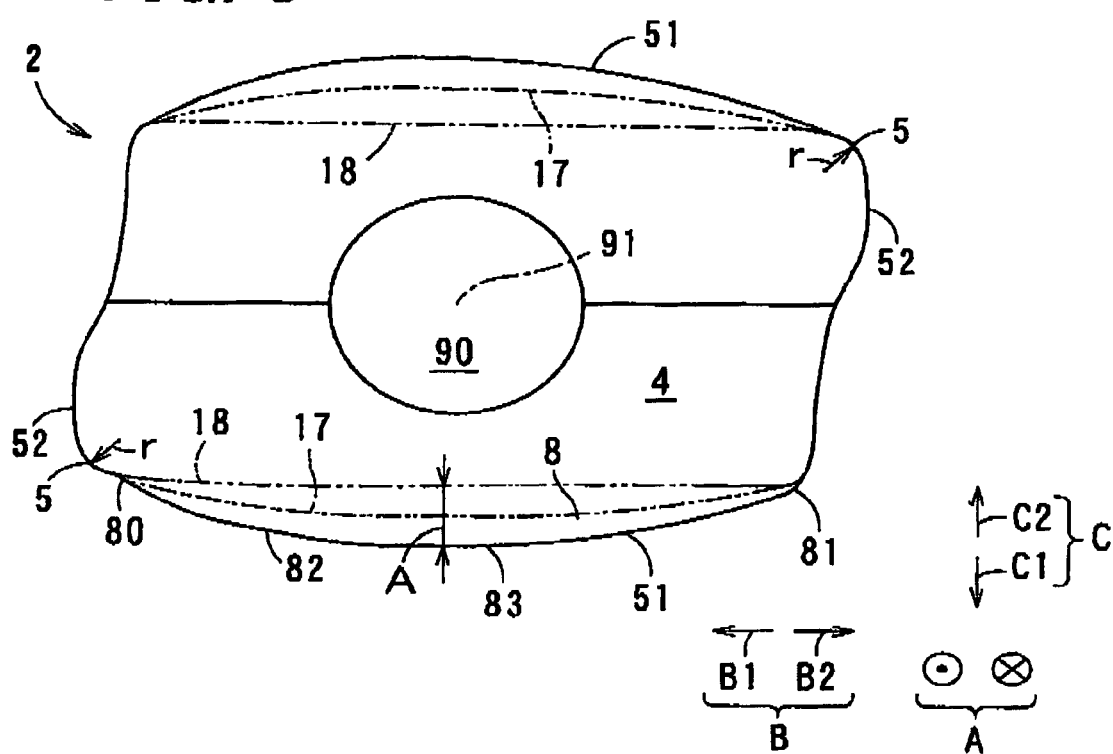
FIG. 5 is a plan view showing the cutting insert exaggerated.
Figure 6:
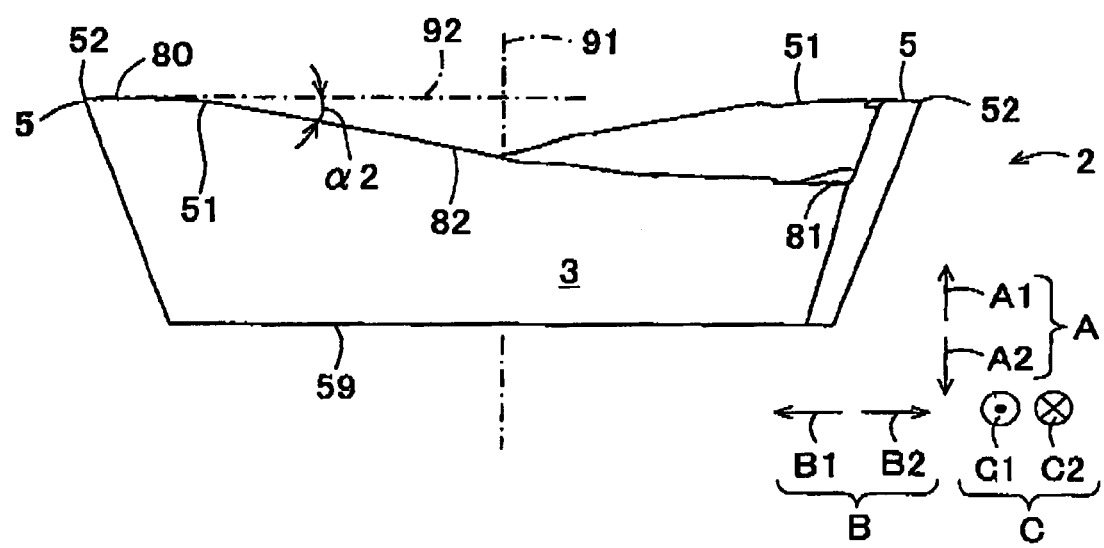
FIG. 6 is a side view of the cutting insert.

FIG. 4 is a perspective view showing partly exaggerated the cutting insert 2 according to the first embodiment of the invention. FIG. 5 is a plan view showing the cutting insert 2 exaggerated. FIG. 6 is a side view of the cutting insert 2.

The cutting insert 2 is substantially plate-shaped. The cutting insert 2 has corner R cutting edges 5 formed at two diagonally opposite corners 70, 72 among the four corners 70 to 73 of an intersection ridge 24 formed by a side face 3 and an upper face 4 of the cutting insert body that is approximately parallelogram-shaped in plan view, and having a long side cutting edge 51 and a short side cutting edge 52 on opposite sides of each of these corner R cutting edges 5.

On the upper face of the cutting insert 2, to smoothly remove chips produced by end milling such as shoulder and grooving work, a rake face 8 with a fixed rake angle is formed along the long side cutting edge 51. In plan view, the insert 2 has a middle part 82 of its long-side cutting edge 51 projecting further in the width direction C than end parts 80, 81 of the long-side cutting edge 51. And in side view, the long-side cutting edge 51 of the insert 2 approaches the bottom face 59 of the insert 2 with progress along it in the length direction B away from a corner R cutting edge 5.

Explaining this in more detail, the insert 2 is formed in an approximate plate shape. When the insert 2 is projected onto a projection plane perpendicular to its thickness direction A, on that projection plane, the insert 2 is approximately parallelogram-shaped, and of its two pairs of sides one pair of sides is longer than the other.

A through hole 90 is formed in the insert 2, passing through it in its thickness direction A. The through hole 90 is disposed in a central position in the length direction B and the width direction C. The through hole 90 is a hole for fixing the insert 2 to the holder 1.

In this embodiment, with the axis 91 of the through hole 90 as a reference axis, the insert 2 is 180°-rotationally symmetrical in shape about this reference axis 91; in other words, it is twice rotationally symmetrical.

Of an upper side of the insert 2 on a first thickness direction A1 side thereof, a long-side cutting edge 51 is formed at each of a pair of mutually opposite long-side edges. And of the same upper face, a short-side cutting edge 52 is formed at each of a pair of mutually opposite short-side edges. The cutting edges 51, 52 are formed at intersection ridge lines where the upper face 4 and side faces 3 of the insert 2 intersect. The long-side cutting edges 51 are formed over substantially the whole of the length direction B of the insert 2.

Each of the cutting edges 52 is formed over a part of the width direction C of the insert 2. The radius of curvature of each of the corner R cutting edges 5 is set to 0.4 mm or more and 4.0 mm or less. A bottom face 59 perpendicular to the reference axis 91 is formed on a bottom side of the insert 2 on a second thickness direction A2 side thereof. This bottom face 59 abuts with the seat face 98 of the holder 1 when the insert 2 is fitted to the holder 1.

As shown in FIG. 5, when the insert 2 is seen in plan view, the length direction middle part 82 of each long-side cutting edge 51 projects further out in the width direction C than the length direction end parts 80, 81. That is, in plan view, of each of the long-side cutting edges 51, the length direction middle part 82 projects outward in the width direction C of an imaginary straight line 18 joining the length direction end parts 80, 81. And the length direction middle part 82 of each of the long-side cutting edges 51 projects outward in the width direction C of a predetermined imaginary curved line 17.

This imaginary curved line 17 is the curved line along which the long-side cutting edge 51 extends when the insert 2 is seen in plan view in the case where, with the insert 2 fitted to the holder 1, the locus of rotation of the main cutting edge is a cylinder. In other words, it is the curved line along which the long-side cutting edge 51 extends when the insert 2 is seen in plan view in the case where, when the locus of rotation 22 of the main cutting edge 6 is cut by an imaginary plane containing the axis of rotation 9, that cross-section of the locus of rotation of the main cutting edge 6 extends in a straight line.

And as shown in FIG. 6, each of the long-side cutting edges 51 slopes toward the bottom face 59 with progress along it in the length direction B away from the respective corner R cutting edge 5. In other words, of the insert 2, the thickness direction A dimension of each of the side faces 3 that are roughly perpendicular to the width direction C decreases with progress away from the respective corner R cutting edge 5 in the length direction B.

Therefore, a plane 92 perpendicular to the reference axis 91 makes a predetermined twist angle α2 with each of the long-side cutting edges 51. Consequently, when the insert 2 has been fitted to the holder 1, the main cutting edge 6 slopes toward the bottom face 59 of the insert 2 with progress from the holder tip end part 54 toward the holder base end part 53. In this way, the long-side cutting edges 51 are formed in a twist shape having a twist angle α2. (In fact, it is sufficient if the long-side cutting edges 51 are roughly sloping in side view. Accordingly, besides extending in a straight line, each of the long-side cutting edges 51 may alternatively extend in a gentle curve shape or may be made up of a combination of a plurality of straight lines or curves.)

As mentioned above, the seat face 98 of the holder 1 slopes at a predetermined slope angle α1. And the long-side cutting edge 51 of the insert 2 slopes at a predetermined twist angle α2. Therefore, as shown in FIG. 3, when the insert 2 is fitted in the holder 1, the axial rake θ of the main cutting edge 6 is positive. That is, with progress toward the holder base end part 53, with respect to a straight line parallel with the axis of rotation 9, the main cutting edge 6 moves away in the opposite direction to the rotation direction of the holder 1. As a result of the axial rake θ being positive like this, the cutting resistance encountered by the main cutting edge 6 can be lowered, and the sharpness of the main cutting edge 6 in end milling work can be improved.

With respect to the positive axial rake angle θ, when, in a side view of the cutting insert, the main cutting edge ridge line consists of a single straight line, the angle made by that straight line and the axis of rotation of the holder can be taken as θ; however, when, in a side view of the cutting insert, the main cutting edge ridge line consists of a combination of a plurality of straight lines or curves, the ends of the main cutting edge 6 (the boundaries with the corners) are connected by a straight line and the angle made by that straight line and the axis of rotation 9 of the holder is taken as θ.

The axial rake θ is the value (α1+α2) obtained by adding the slope angle α1 to which the seat face 98 of the holder 1 is set to the twist angle α2 to which the long-side cutting edge 51 of the insert 2 is set. In this embodiment, because the slope angle α1 and the twist angle α2 are both positive, the axial rake θ can be made large, and the cutting resistance can be lowered further. And as long as the axial rake θ is positive, one or the other of the slope angle α1 and the twist angle α2 may alternatively be made zero.

In an end mill 10 according to the invention, as shown in FIG. 1, the main cutting edge 6 is made to curve further than the milling tool of Japanese Patent No. 3085686, and the main cutting edge 6 is formed in a substantially cylindrical shape swelling outward in the holder radial direction with progress from either end 61, 62 of the main cutting edge 6 toward its center 63. In other words, a sectional shape of the locus of rotation of the main cutting edge 6 cut by an imaginary plane including the axis of rotation 9 and extending along the axis of rotation 9 is not a straight line but rather an approximate circular arc.

As a result, when the cutting insert 2 is rotated while fitted in the holder 1, even if a difference arises in the turning radii of the holder axial direction end parts 61, 62 of the main cutting edge 6, the steps produced between the passes by multi-cut machining in shoulder work or grooving work can be made small, and consequently high-quality product machining with high machined surface roughness becomes possible.

Explaining this in more detail, as shown in FIG. 1, the locus of rotation 22 of the main cutting edge 6 is an approximate cylinder shape in which the holder axial direction middle part 60 swells convexly further outward in the holder radial direction than the holder axial direction end parts 61, 62. In this embodiment, the sectional shape of the locus of rotation 22 of the main cutting edge 6 when cut by the above-mentioned imaginary plane is an approximate circular arc shape that swells outward with progress from the holder axial direction end parts 61, 62 of the locus of rotation of the main cutting edge toward the center part 63 of the locus of rotation of the main cutting edge. That is, the center part 63 of the locus of rotation 22 of the main cutting edge 6 projects farthest in the outward holder radial direction R2.

Here, the middle part 60 of the locus of rotation of the main cutting edge 6 is the section excluding the end parts 61, 62 of the locus of rotation of the main cutting edge 6. And the center part 63 of the locus of rotation of the main cutting edge 6 is a portion of the middle part 60 and is the section in the holder axial direction center of the locus of rotation of the main cutting edge 6.

In the locus of rotation 22 of the main cutting edge 6, the amount of swell w in the radial direction constituting the outward holder radial direction R2 dimension from the end parts 61, 62 to the center part 63 is set to 0.02 mm or more and 0.06 mm or less. And when a minimum value of the allowed radial direction swell amount w is written w1, a maximum value of the allowed radial direction swell amount w is written w2, and the holder axial direction dimension between the end parts 61, 62 is written m, then the radius of curvature s of the locus of rotation of the main cutting edge is set to at least $\{(w1)^2+(m/2)^2\}/(2 \cdot w1)$ and not greater than $\{(w2)^2+(m/2)^2\}/(2 \cdot w2)$.

Figure 7:
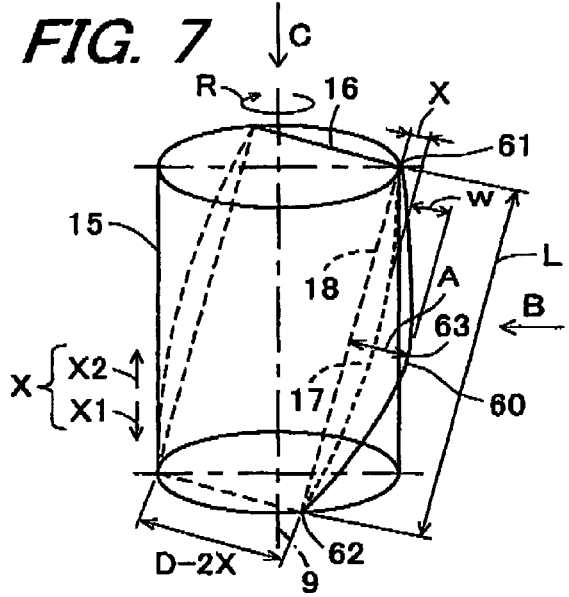
FIG. 7 is a perspective view illustrating the locus of rotation of a main cutting edge.
Figure 8:
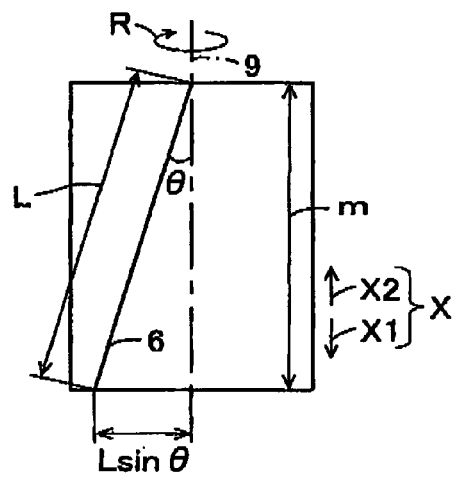
FIG. 8 is a view in the direction of the arrow B in FIG. 7.
Figure 9:
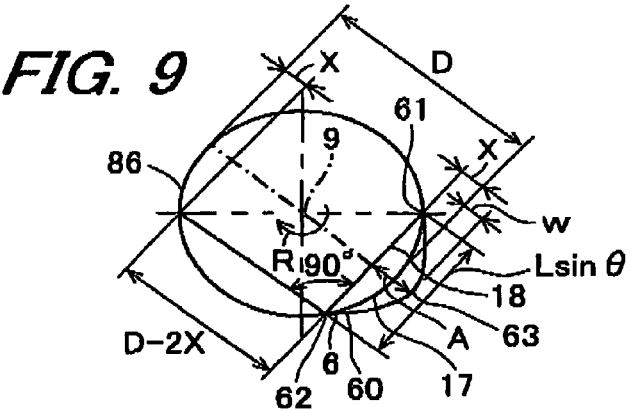
FIG. 9 is a view in the direction of the arrow C in FIG. 7.

FIG. 7 is a perspective view for illustrating the locus of rotation 22 of the main cutting edge 6. FIG. 8 is a view in the arrow B direction in FIG. 7. FIG. 9 is a view in the arrow C direction in FIG. 7. Using FIG. 7 to FIG. 9, the locus of rotation 22 of the main cutting edge 6 of this embodiment will now be explained.

The end parts 61, 62 of the main cutting edge 6 are disposed apart from each other in the holder axial direction X. And in an ideal state, the end parts 61, 62 of the main cutting edge 6 are both the same radial direction distance (D/2) from the axis of rotation 9. And because the axial rake θ of the main cutting edge 6 is set to be positive, as shown in FIG. 9, the holder base part end 61 of the main cutting edge 6 is positioned downstream of the holder tip part end 62 in the end mill rotation direction R.

The cylinder formed by a circle 86 made when the end parts 61, 62 of the main cutting edge 6 complete a rotation about the axis of rotation 9 extending in the holder axial direction X will be called the imaginary cylinder 15. In this case, the imaginary straight line is joining together the holder base part end 61 and the holder tip part end 62 proceeds from the holder base part end 61 to the holder tip part end 62 on the inner side of the outer surface of the imaginary cylinder 15. And when an imaginary plane 16 containing the upper face 4 of the insert 2 is set, this imaginary plane 16 includes the imaginary straight line 18.

A curved line extending in the imaginary plane 16 from the holder base part end 61 of the main cutting edge 6 to the holder tip part end 62 will be called the imaginary curved line 17. In the invention, the middle part 60 of the main cutting edge 6 extends in the imaginary plane 16 and curves further outward in the holder radial direction than the imaginary curved line 17 in an approximate circular arc shape.

Here, a view of the insert 2 seen in a direction perpendicular to the imaginary plane 16 shown in FIG. 7 is the plan view of the insert 2 in FIG. 5. That is, the imaginary straight line 18 and the imaginary curved line 17 shown in FIG. 7 and FIG. 9 are respectively the imaginary straight line 18 and the imaginary curved line 17 shown in FIG. 5. And the amount of radial direction swell w mentioned above is the holder radial direction distance from the imaginary curved line 17 to the center part 63 of the main cutting edge 6.

With respect to the end mill 10 according to the invention, when the holder machining diameter is written D (mm), the length of the imaginary straight line 18 joining together the ends 61, 62 of the main cutting edge 6 is written L (mm), the axial rake angle of the main cutting edge ridge 6 is written θ (°), and a maximum width between the imaginary straight line 18 and the imaginary cylindrical plane 16 is written X, an amount of swell A (mm) which indicates a swell of the center 64 of the main cutting edge in the holder radial direction with respect to the imaginary straight line 18 satisfies the following relationship X+0.02≦A≦X+0.06.

Herein, the maximum width X between the imaginary straight line 18 and the imaginary cylindrical plane 16 satisfies the following relationship $(D-(D^2-L^2 \sin^2 \theta)^{1/2})/2$.

In FIG. 9, providing the maximum width of the imaginary curved line 17 in the holder radial direction with respect to the imaginary straight line 18 is written X, then the following relationship is established:

$$D^2 = (D-2X)^2 + (L \sin \theta)^2.$$

That is, $$X = (D-(D^2-L^2 \sin^2 \theta)^{1/2})/2.$$

The construction that the main cutting edge 6 extends along the imaginary curved line 17 is a construction that the long-side cutting edge 51 of the cutting insert 2 is disposed on an imaginary cylinder, i.e. the construction shown in Japanese Patent No. 3085686. In the invention, the main cutting edge 6 extends to curve further out in the holder radial direction than the imaginary curved line 17. Therefore, in the invention, compared to the main cutting edge shown in Japanese Patent No. 3085686, the center part of the main cutting edge 6 projects further outward in the holder radial direction.

Figure 10:
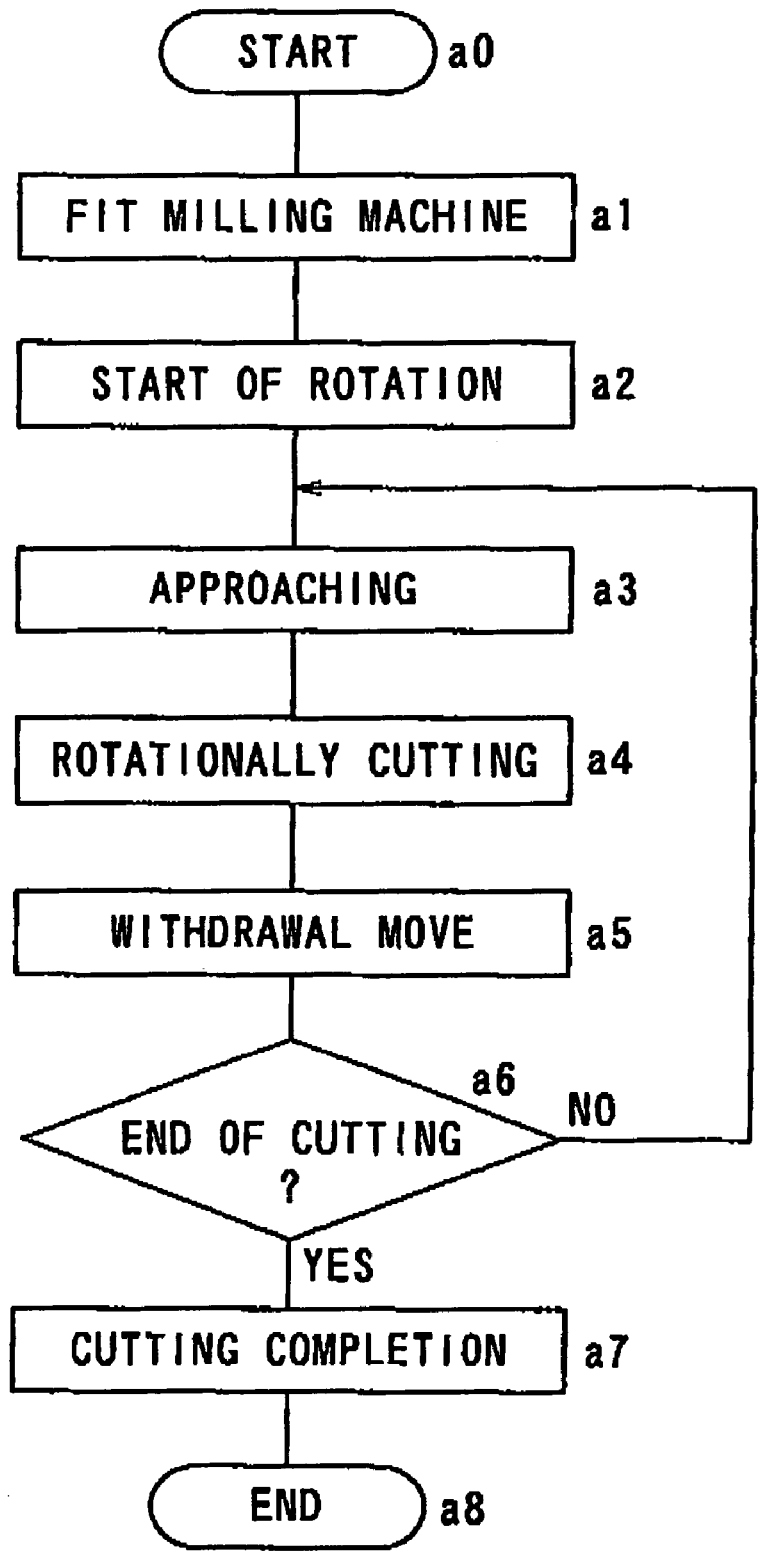
FIG. 10 is a flow chart showing a procedure for cutting a workpiece using the end mill.

FIG. 10 is a flow chart showing a procedure for cutting a workpiece using the end mill 10. The end mill 10 is fitted to a milling machine or the like to cut a workpiece.

A milling machine includes translation driving means for driving translation of a clamped workpiece and a chucked end mill 10 relative to each other, and rotation driving means for rotating the chucked end mill 10 about its axis of rotation 9. The end mill 10 makes contact with the workpiece while rotating about the axis of rotation 9, and discretely cuts the workpiece with the cutting edges 51, 52 formed on the inserts 2. Accordingly the work piece can be machined to a predetermined shape.

When the cutting edges 51, 52 of an insert 2 have worn or broken, an insert 2 having new cutting edges 51, 52 is fitted to the holder 1 in place of the insert 2 of which the cutting edges 51, 52 have worn or broken, and the cutting capability of the end mill 10 is thereby restored.

In a step a0, an operator prepares for machining operation by clamping a workpiece to the milling machine and for example inputting a cutting program to the milling machine. When the operator finishes this preparation, he proceeds to step a1 and starts machining operation. In step a1 the operator carries out a mounting step of fitting a cutting insert 2 to a holder 1 to make an end mill 10 and fitting the end mill 10 to the milling machine, and then proceeds to step a2.

In step a2, with the milling machine, rotation of the end mill 10 is started. In step a3, with the milling machine, an approach step of bringing the end mill 10 close to a cutting position where the workpiece is to be cut is carried out, and then proceeds to step a4.

In step a4, with the milling machine, the rotating end mill 10 is brought into contact with the workpiece, and then in this contacting state the end mill 10 and the workpiece are moved translationally relative to each other in a direction orthogonal to the axis of rotation. In this way, a cutting step of rotationally cutting the workpiece with the end mill 10 is carried out, and then proceeds to step a5.

In step a5, when the end mill 10 has moved to a predetermined translation end position, with the milling machine, a withdrawal step of moving the end mill 10 away from the workpiece is carried out. In step a6, it is determined by an operator or the like whether or not the predetermined cutting operation has been completed. When it is determined that the predetermined cutting operation has been completed, the procedure moves on to step a7. And when it is determined that the cutting operation has not been completed, to carry out the next cutting operation the procedure returns to step a3 and the end mill 10 is moved to a cutting start position for carrying out the next cutting operation.

In step a7, rotation of the end mill 10 is stopped. In step a8, cutting of the workpiece with the end mill 10 is ended.

For example when multi-cut machining is carried out to shoulder-cut or groove-cut the workpiece, in the cutting completion determination step a6 it is determined whether or not a number of cuts based on a predetermined depth of cut have been made, and cutting operation is repeated until the number of cuts reaches a predetermined number.

Figure 11A:
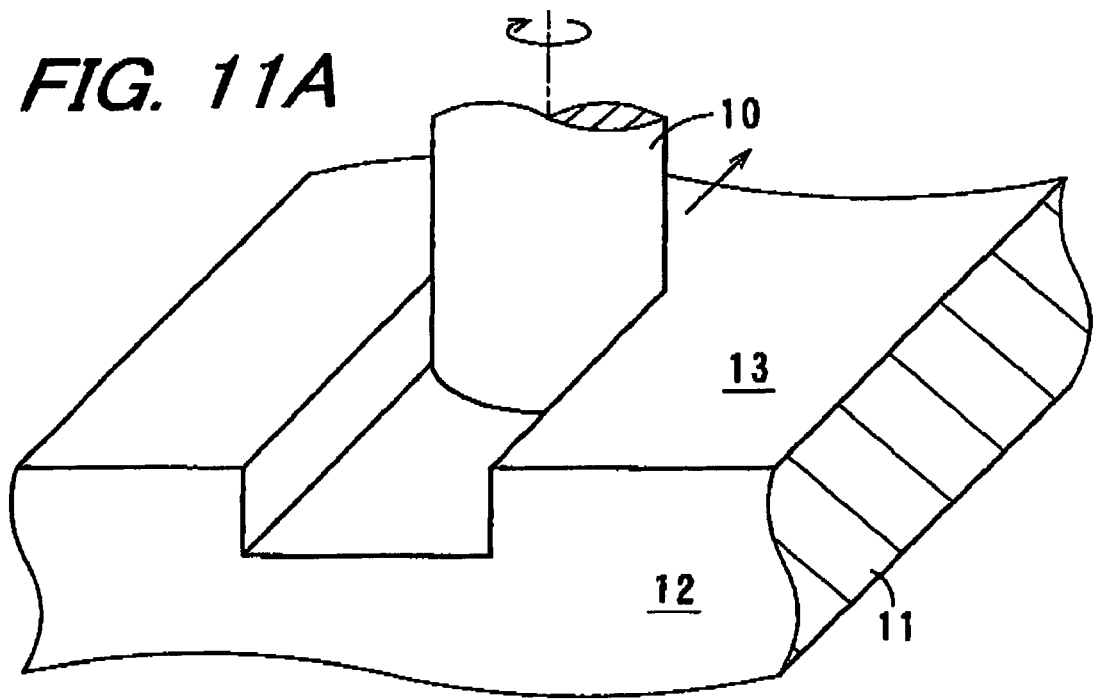
FIG. 11A is a perspective view showing groove-cutting of a workpiece with the end mill.
Figure 11B:
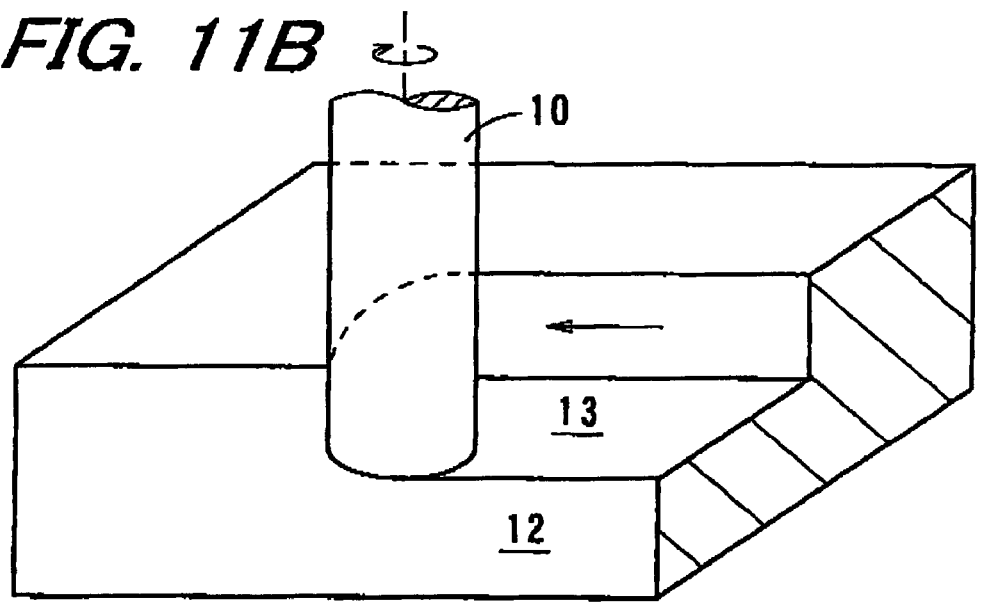
FIG. 11B is a perspective view showing shoulder-cutting of a workpiece with the end mill.
Figure 12A:
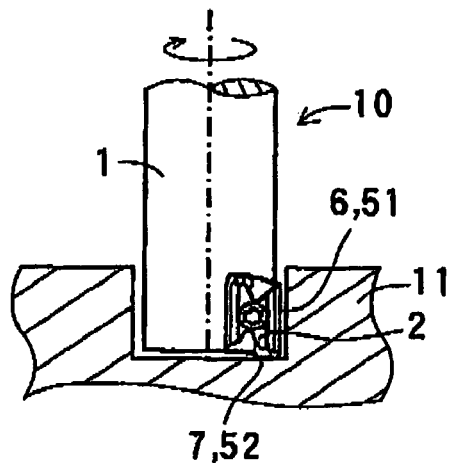
FIGS. 12A through 12C are views illustrating a procedure for groove-cutting a workpiece with the end mill by multi-cut machining, FIG. 12A showing an n-th cut, FIG. 12B showing an n+1-th cut, and FIG. 12C showing an n+2-th cut.
Figure 12B:
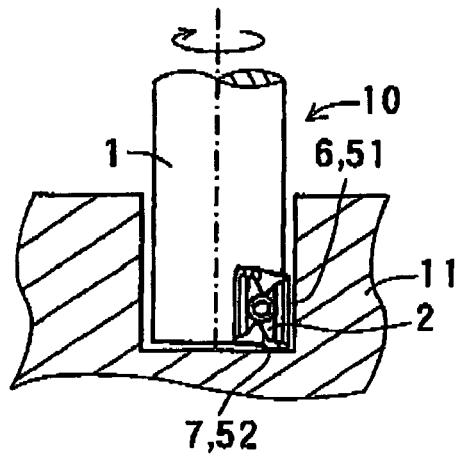
Figure 12C:
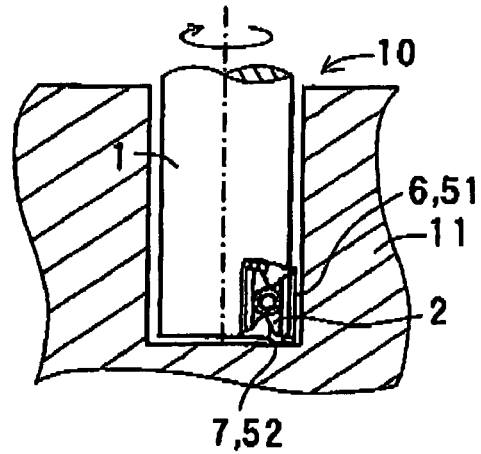

FIG. 11A shows a cutting state of groove-cutting and FIG. 11B a cutting state of shoulder-cutting. FIGS. 12A through 12C are views illustrating a multi-cut machining procedure for groove-cutting a workpiece with an end mill 10.

In the case of groove-cutting, the end mill 10, with its tip end part 54 fed to below the upper face 13 of the workpiece by a predetermined axial direction cut depth, makes contact with the workpiece 11 from a side face 12 of the workpiece, and moves in a direction orthogonal to the axis of rotation 9. The end mill 10 has a pre-set axial direction depth of cut that the end mill is capable of cutting in one cutting operation.

For example when a groove of the required depth cannot be cut in one cutting operation, cutting operations are carried out one after another in the order shown in FIGS. 12A through 12C, and the cut workpiece 11 is cut further from its upper surface. That is, multiple cutting operations of rotationally cutting the wall face of the workpiece 11 are carried out at different levels in the holder axial direction. By multi-cut machining being carried out like this, a groove of the required depth can be formed. And similarly in the case of shoulder-cutting, the workpiece can be cut to the required shape.

Figure 13:
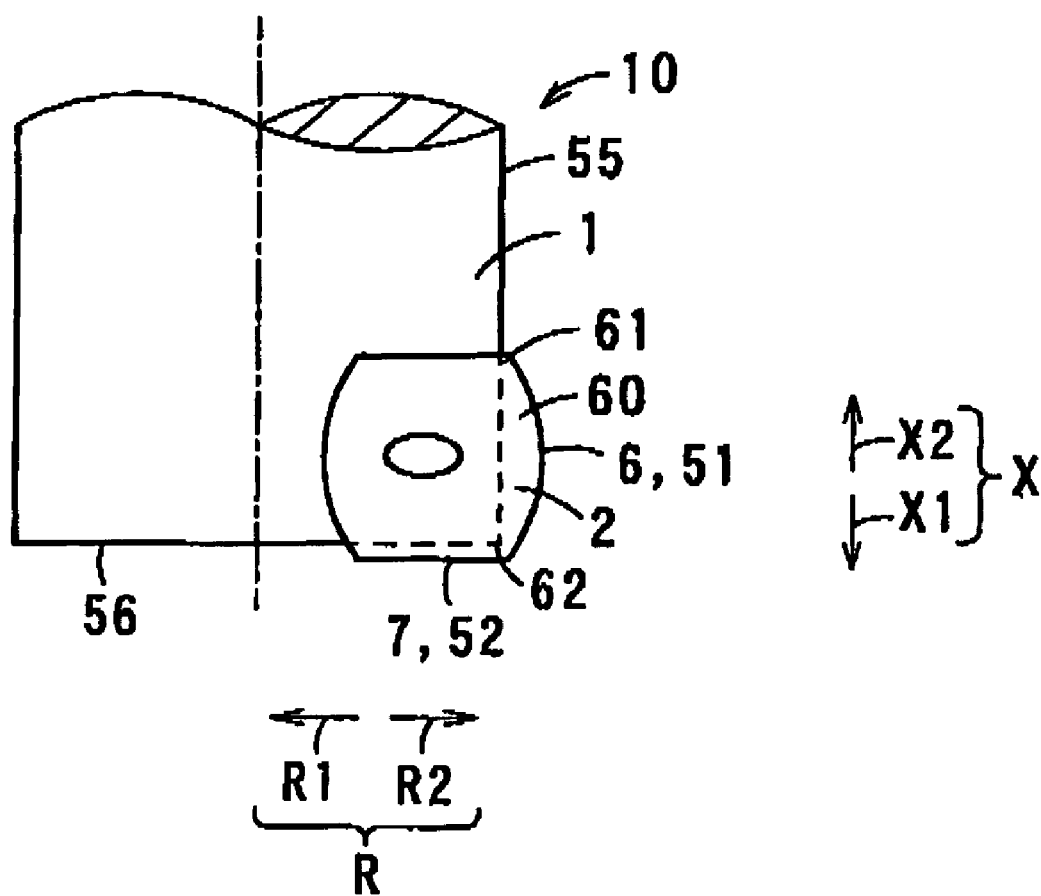
FIG. 13 is a front view showing exaggerated a tip end part of the end mill.

FIG. 13 is a view showing exaggerated the tip end part 54 of an end mill 10, and FIG. 14 is a sectional view showing changes of the machined wall face of a workpiece 11 in multi-cut machining. Of the main cutting edge 6, the holder axial direction center part 63 projects further in the outward holder radial direction R2 than the holder axial direction end parts 61, 62.

Figure 14A:
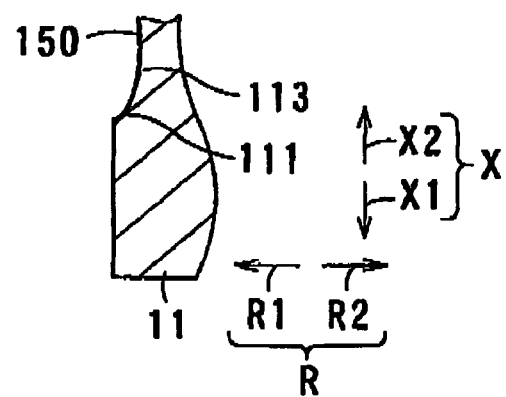
FIGS. 14A through 14C are sectional views showing changes in a machined wall face of a workpiece 11 in multi-cut machining, FIG. 14A showing a machined wall face in an n-th cut, FIG. 14B showing the machined wall face in an n+1-th cut, and FIG. 14C showing the machined wall face in an n+2-th cut.
Figure 14B:
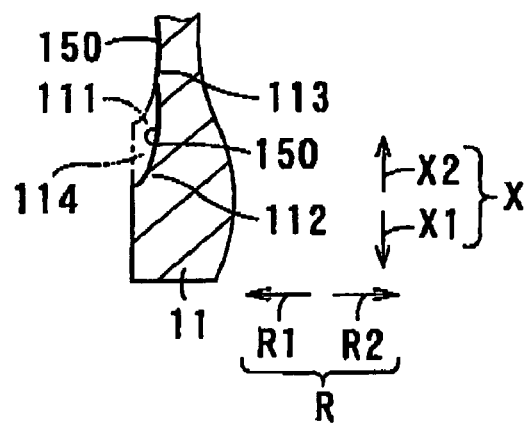
Figure 14C:
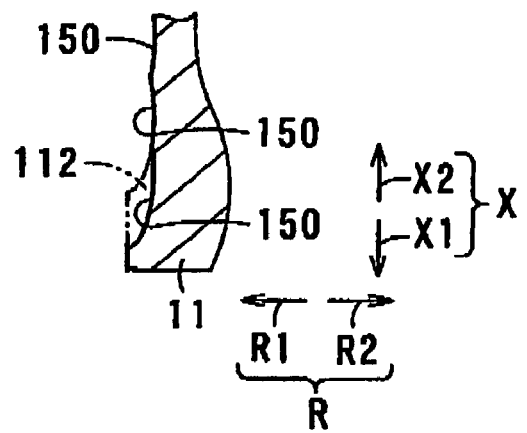

As shown in FIG. 14A, when an n-th cut is carried out, the machined wall face is cut in a shape following a curved surface 150 according to the locus of rotation of the main cutting edge 6. Then, as shown in FIG. 14B, in an n+1-th cut, the cutting is carried out in a state where the end mill 10 is inserted in an axial direction X1 compared to the n-th cut. And a part to be cut 111 of the workpiece having been cut in the n-th cut by the holder axial direction tip end part 62 of the main cutting edge, is cut by the holder axial direction middle part 60 of the main cutting edge 6. The holder axial direction base part 61 of the main cutting edge 6 passes through a vicinity of a part to be cut 113 of the workpiece having been cut in the n-th cut by the holder axial direction middle part 60 without cutting. As shown in FIG. 14C, in the n+1-th cut, the cutting is carried out in a state where the end mill 10 is inserted in an axial direction X1 compared to the previous stage. By repeating the cutting in such a manner, it is possible to form a deep groove (shoulder) portion in the workpiece 11.

Here, it is desirable for the axial direction depth of cut of the end mill 10 in one cutting operation to be set to below the holder axial direction dimension m of the main cutting edge 6, and still more preferably to be set to below half of the axial direction dimension m of the main cutting edge 6. This makes it possible to remove, with the holder axial direction middle part 60 of the main cutting edge 6, more of the part to be cut of the workpiece have been cut in the previous cutting operation by the holder axial direction tip part 61.

Figure 15A:
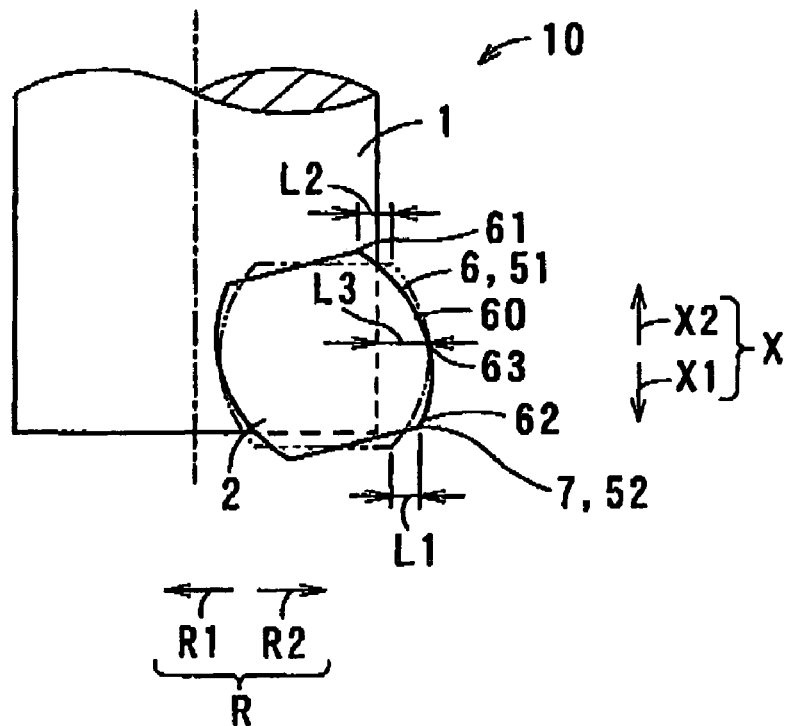
FIG. 15A is a view showing an end mill according to the invention with a difference in the holder radial direction between distances from the axis of the holder to the holder axial direction end parts of the main cutting edge.
Figure 15B:
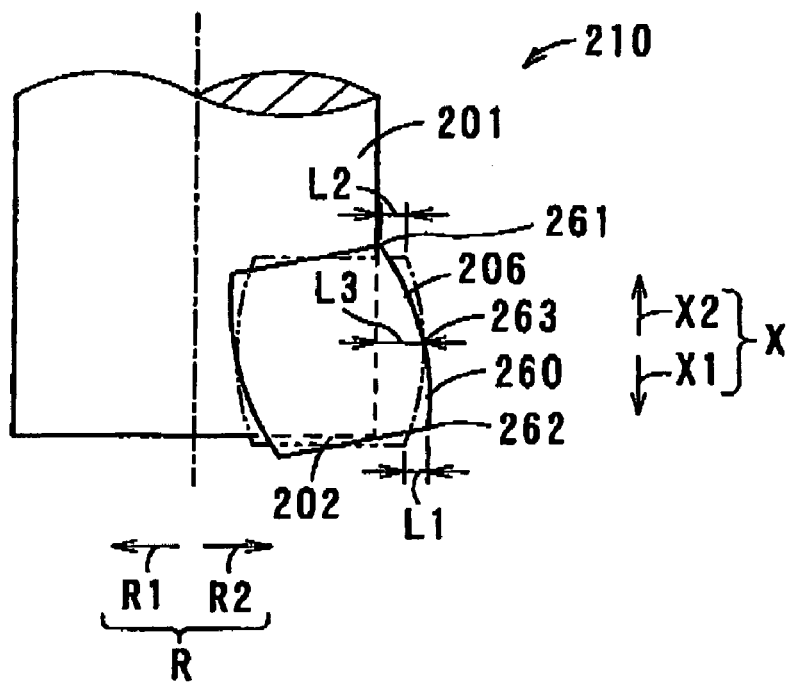
FIG. 15B is a view showing an end mill of a comparative example with a difference in the holder radial direction between distances from the axis of the holder to the holder axial direction end parts of the main cutting edge.

FIG. 15A is a view showing a state wherein there is a difference in the holder radial direction R between distances from the axis of the holder to the holder axial direction end parts 61, 62 of the main cutting edge 66 of an end mill 10 according to the invention. FIG. 15B is a view showing a state wherein there is a difference in the holder radial direction R between distances from the axis of the holder to the holder axial direction end parts 261, 262 of the main cutting edge 206 of an end mill 210 of a comparative example. In the end mill 210 of the comparative example, the main cutting edge 206 extends along the imaginary curved line 17 discussed earlier.

Due to dimensional error of the insert 2, 202, error in mounting of the insert 2, 202 to the holder 1, 201, and bending of the holder 1, 201, it is difficult to make the difference in the holder radial direction R between distances from the axis of the holder to the holder axial direction end parts 61, 62 or 261, 262 of the main cutting edge 6 or 206 zero.

For example, on the insert itself, In a state where the insert is attached to the holder 1, 201, variation arises in a size difference in the holder radial direction between the holder axial direction tip part 62 and the holder axial direction base part 61 of the main cutting edge 6, 206 over a range of ±50 μm. And as bending of the end mill 10, 210, bending of at most 0.3 mm in the holder radial direction R may arise in the holder 1, 201 during cutting.

In the invention, even if a difference R in the holder radial direction has arisen at the holder axial direction end parts 61, 62 of the main cutting edge 6, a part of the holder axial direction middle part 60 of the main cutting edge 6 projects further out in the holder radial direction than the holder axial direction end parts 61, 62. That is, the radial direction dimension L3 of a part of the holder axial direction center part 63 is greater than the radial direction dimensions L1, L2 of the holder axial direction end parts 61, 62.

With respect to this, in the comparative example, as a result of a difference arising in the holder radial direction R between distances from the axis of the holder to the holder axial direction end parts 261, 262 of the main cutting edge 206, one or the other of the holder axial direction end parts 261, 262 of the main cutting edge 206 projects further in the outward holder radial direction R2 than the holder axial direction center part 263. That is, one or the other of the radial direction dimensions L1, L2 of the holder axial direction end parts 261, 262 is larger than the radial direction dimension L3 of the holder axial direction center part 263.

Figure 16A:
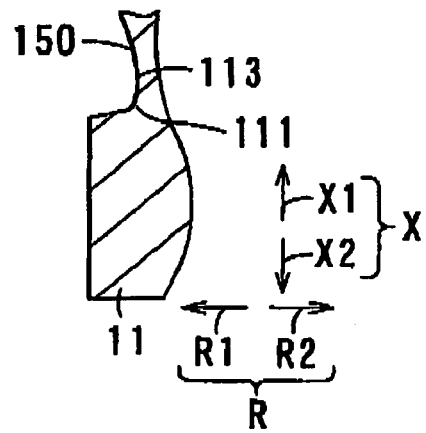
FIGS. 16A through 16C are sectional views showing changes in a machined wall face of a workpiece when there is a difference in the holder radial direction R between distances from the axis of the holder to the holder axial direction end parts of the main cutting edge of an end mill according to the invention, FIG. 16A showing the machined wall face in an n-th cut, FIG. 16B showing the machined wall face in an n+1-th cut, and FIG. 16C showing the machined wall face in an n+2-th cut.
Figure 16B:
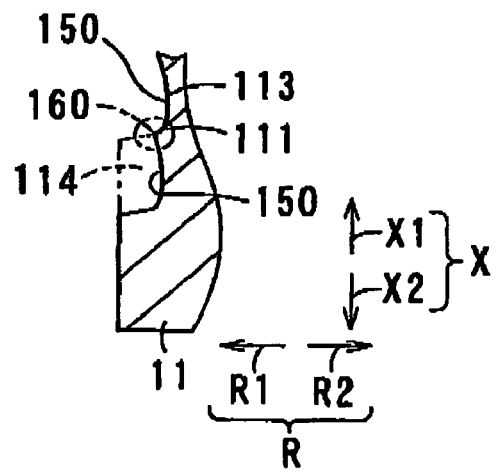
Figure 16C:
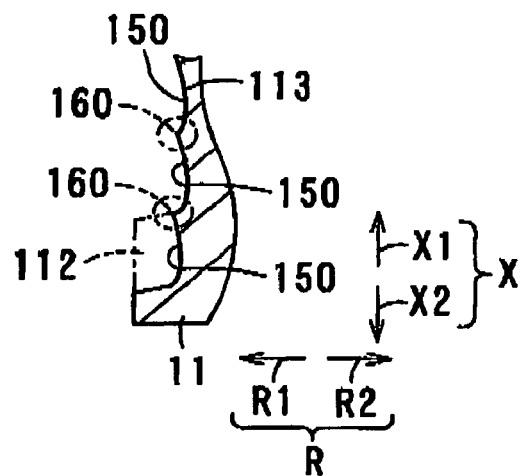
Figure 17A:
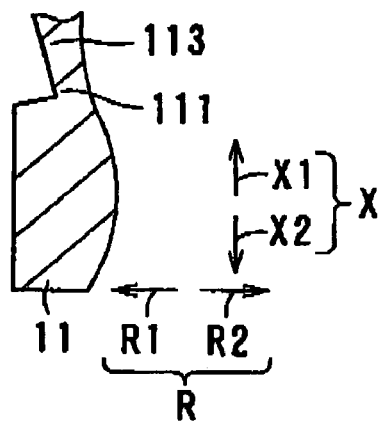
FIGS. 17A through 17C are sectional views showing changes in a machined wall face of a workpiece when there is a difference in the holder radial direction R between distances from the axis of the holder to the holder axial direction end parts of the main cutting edge or the end mill of the comparative example, FIG. 17A showing the machined wall face in an n-th cut, FIG. 17B showing the machined wall face in an n+1-th cut, and FIG. 17C showing the machined wall face in an n+2-th cut.
Figure 17B:
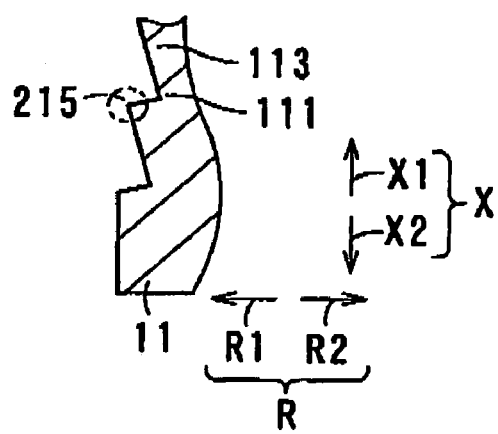
Figure 17C:
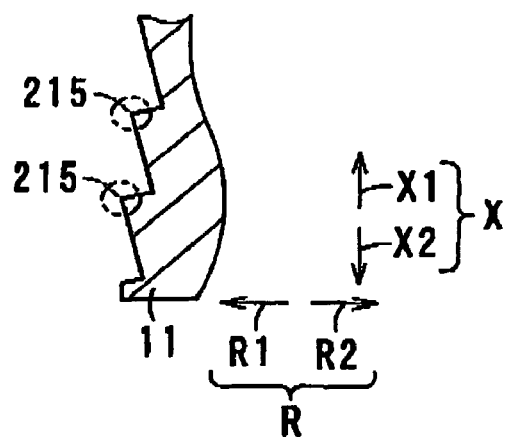

FIGS. 16A through 16C are sectional views showing changes of a machined wall face of a workpiece 11 when there is a difference in the holder radial direction R between distances from the axis of the holder to the holder axial direction end parts 61, 62 of the main cutting edge 6 in an end mill 10 according to the invention. FIGS. 17A through 17C are sectional views showing changes of a machined wall face of a workpiece when there is a difference in the holder radial direction R between distances from the axis of the holder to the holder axial direction end parts 261, 262 of the main cutting edge 6 in an end mill 210 of the comparative example.

As shown in FIGS. 16A through 16C and FIGS. 17A through 17C, when a difference in the holder radial direction R between distances from the axis of the holder to the holder axial direction end parts 61, 62 or 261, 262 of the main cutting edge 6 or 206 has arisen, compared to the case where the difference in the holder radial direction between distances from the axis of the holder to the holder axial direction end parts 61, 62 or 261, 262 of the main cutting edge 6, 206 is zero, at one of the holder axial direction end parts 61, 62 or 261, 262 a cutting amount increases, and at the other an cutting amount decreases.

In the invention, compared to the comparative example, the holder axial direction middle part 60 of the main cutting edge 6 removes more of the workpiece. Accordingly, it is possible to reduce steps 160 produced between the passes by the multi-cut machining that arise due to the difference in the cutting amount between the holder axial direction end parts of the main cutting edge 6. Consequently, the affect on the machined surface roughness of the cut machined wall face of the above-mentioned difference in the holder radial direction R positions of the holder axial direction end parts 61, 62 of the main cutting edge 6 can be made small.

In contrast to this, in the comparative example, because the holder radial direction dimension L3 of the holder axial direction middle part 260 of the main cutting edge 206 is smaller than the holder radial direction dimension L1 or L2 of one or the other of the holder axial direction end parts 261, 262, the workpiece cannot be fully removed by the holder axial direction middle part 260. In other words, of the main cutting edge 206, the holder axial direction end part 261 having a larger radial direction dimension than the holder axial direction middle part 260 cuts the workpiece excessively. Consequently, in the machined wall face of the workpiece cut with the end mill 210 of the comparative example, large steps form at the joins 215 in multi-cut machining.

As explained above, as shown in FIGS. 16A through 16C and FIGS. 17A through 17C, compared to the comparative example, with the invention it is possible to make the machined surface roughness of the machined wall face of the workpiece 11 after cutting higher.

Figure 18A:
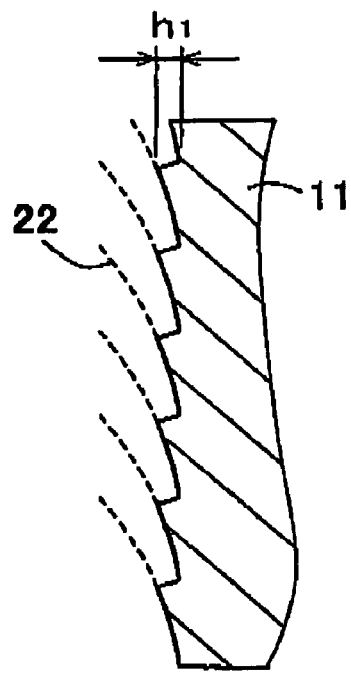
FIG. 18A is a sectional view showing exaggerated the machined wall face of a workpiece multi-cut machined in shoulder-cutting with an end mill according to the invention.
Figure 18B:
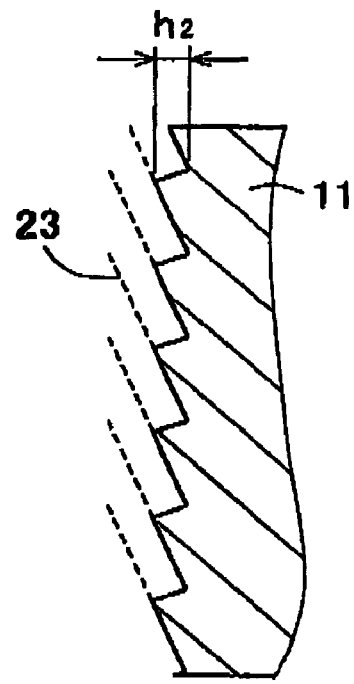
FIG. 18B is a sectional view showing exaggerated the machined wall face of a workpiece multi-cut machined in shoulder-cutting with an end mill of the comparative example.

FIG. 18A is a schematic sectional view of a machined wall face of a workpiece multi-cut machined in shoulder work with an end mill according to the invention, and FIG. 18B is a schematic sectional view of a machined wall face of a workpiece multi-cut machined in shoulder work with an end mill of the comparative example. In the end mill 210 of the comparative example shown in FIG. 18B, in an ideal situation where no difference arises between the turning radii of the ends 261, 262 of the main cutting edge 206, there is no formation of a step on the machined wall face.

However, on close examination it often happens that due to variation of the fitting accuracy of the cutting insert 2, 202 and the holder 1 or variation of dimensional accuracy or the like the cutting insert is fitted with the main cutting edge slanting so that one of its ends projects further outward than the other, and when multi-cut machining is carried out with an end mill in this kind of state, a step matching the locus of rotation of the cutting edge on each pass forms in the machined wall face of the workpiece in the end mill 210 of the comparative example.

Specifically, supposing that a cutting insert according to the invention and a cutting insert of the comparative example are fitted slanting at the same angle, then the state of the resulting machined face at the end of the cutting edge will be the shape shown in FIGS. 18A and 18B respectively. That is, of the loci of rotation 22, 23 of the main cutting edge shown with dashed lines in FIGS. 18A and 18B, it can be seen that in the case of the locus of rotation 22 of the main cutting edge according to the invention, more than in the case of the locus of rotation 23 of the main cutting edge of the comparative example, the main cutting edge inserts more into the workpiece wall face as a result of the central part of the main cutting edge being swollen outward, and when multi-cut machining is carried out repeatedly the step h1 in the machined wall face arising between the passes is smaller in the case of the main cutting edge according to the invention than the step h2 in the case of the main cutting edge of the comparative example, and the wall face machined with the end mill of the invention has smaller steps and higher roughness of the machined face at the machining end part also, as is clear from FIGS. 18A and 18B. Here, the step $h_1$, $h_2$ in the machined wall face means the step between the holder axial direction tip end of the cut trace made by the present cutting operation and the holder axial direction base end of the cut trace made by the cutting operation following the present cutting operation.

For example as cutting conditions of multi-cut machining, the cutting speed was made 120 m/min, the feed per 1 tooth was made 0.1 mm, the radial direction depth of cut was made 10 mm, the axial direction depth of cut was made 5 mm, the length L of the main cutting edge 6 in plan view was made 10 mm, the axial rake of the main cutting edge 6 was made 20°, a carbon steel for machine structure use S50C specified in JIS G 4051 was used as the workpiece, and during cutting no cutting liquid was used but air blowing was carried out. The machined wall face step h of a workpiece cut under these cutting conditions is shown in the following table.

| END MILL TYPE | STEP h |
|---|---|
| End mill of the invention | 14 μm |
| End mill with main cutting edge on imaginary line 17 | 33 μm |
| End mill with main cutting edge on imaginary line 18 | 52 μm |

As this table shows, it was found in experimental results that the step h in the machined wall face is smaller with the end mill 10 of the invention than with the end mill 210 of the comparative example.

The amount w of swell in the holder radial direction from the holder axial direction end parts to a projection part projecting most outward in the holder radial direction of the holder axial direction middle part with respect to the locus of rotation of the main cutting edge 6 is preferably 0.02 mm or more and 0.06 mm or less. Accordingly, even if there is a certain amount of variation in the mounting state of the cutting insert 2, machining steps can be kept small and an ample machined surface roughness increasing effect can be obtained.

Specifically, when the amount of swell w in the holder radial direction R is less than 0.02 mm, variation in the main cutting edge position arising when the insert 2 is fitted to the holder 1, that is, the difference in the holder radial direction between distances from the axis of the holder to the holder axial direction end parts 61, 62 of the main cutting edge 6, cannot be absorbed, and the steps at the joins between successive cuts become large. And when the amount of swell w in the holder radial direction R exceeds 0.06 mm, due to the affect of this swell in the holder radial direction R of the main cutting edge 6, the machined wall face becomes too concave, and the steps at the joins between successive cuts become large as a result of that.

With respect to this, with the invention, by the amount of swell w in the holder radial direction R being made 0.02 mm or more and 0.06 mm or less, without the holder radial direction R swell w becoming too large, a holder radial direction R difference between distances from the axis of the holder to the holder axial direction end parts 61, 62 of the main cutting edge 6 can be absorbed. Accordingly it is possible to make the steps arising at the joins between successive cuts small and to stably obtain a high-quality machined wall face.

Also, by forming corner R cutting edges 5 of radius of curvature r being 0.4 mm or more and 4.0 mm or less at the corner R parts continuous with the main cutting edges 6, the step at the end of the main cutting edge can be made smaller and the machined surface roughness increased.

In the end mill 10 according to the invention, when the amount of swell A (mm) satisfies the following relationship $X+0.02 \leqq A \leqq X+0.06$, even in the case of a milling tool of which the holder machining diameter, the size of the cutting tool insert (the main cutting edge), and the axial rake angle of the main cutting edge ridge line as of when the cutting tool insert is mounted to the holder all individually differ, the shape of the main cutting edge ridge line is optimized, and when multi-cut machining is carried out in shoulder work or grooving work, the steps arising between passes as a result of the machining of multiple passes can be made small.

In addition, in the end mill shown in Japanese Patent No. 3085686, as mentioned above, due to variation of the fitting accuracy between the holder and the cutting insert or variation of dimensional accuracy, a difference arises between the turning radii of the ends of the main cutting edge when the cutting insert is mounted to the holder, and when multi-cut machining is carried out in shoulder work or grooving work, large steps arise at the joins between passes in the machining of multiple passes in the machined wall face.

With respect to this, in the end mill according to the invention, the amount of swell A satisfies the following relationship $X+0.02 \leqq A \leqq X+0.06$. Consequently, the sectional shape of the locus of rotation of the main cutting edge 6 is not a straight line but rather is an approximate circular arc, swelling with progress toward its center 63. As a result, in real machining, where there is a difference between the turning radii of the ends 61, 62 of the main cutting edge, it is possible to make the steps arising in the machined wall face small as described above.

By this kind of relationship being satisfied, the sectional shape of the locus 22 of rotation of the main cutting edge 6 always takes a suitable circular arc shape, irrespective of the holder diameter D, the length L of the insert 2, or the amount of the axial rake angle θ, and a stable machined surface roughness can be obtained.

It is desirable for an insert 2 with a different holder radial direction R swell shape of the locus of rotation 22 of its main cutting edge 6 to be prepared for each diameter D of the holder and size L of the insert 2. However, if the repertory of inserts 2 is made overly large, its management becomes complicated. So, a swell shape of the main cutting edge 6 such that unevenness of the machined wall face is made small is designed. And in a case where inserts 2 is fitted in holders of different diameters from holders used frequently, the design is made so as to adjust the axial rake and radial rake of the main cutting edge 6 by changing an inclination of the seat face of the holder, and make the unevenness small without changing the shape of the insert 2. Accordingly it is possible both to manage and design multiple inserts easily and to form machined wall faces having small unevenness on workpieces.

In this embodiment, the holder axial direction center part 63 swells further out in the holder radial direction R than the holder axial direction end parts 61, 62 to form an approximate circular arc shape. Accordingly, most of the part to be cut of the workpiece in which its cutting amount is small formed by one of the holder axial direction end parts 61, 62 of the main cutting edge 6 in a previous cutting operation can be cut by the holder axial direction middle part 63 of the main cutting edge 6, and the machined surface roughness of the machined wall face after cutting can be improved further.

And in this embodiment, the holder axial direction center part 63 of the main cutting edge 6 projects farthest in the outward holder radial direction R2. As a result of this, whether the holder axial direction tip end part 62 of the main cutting edge 6 projects further outward in the holder radial direction R2 than the holder axial direction base end part 61 or the holder axial direction base end part 61 projects further outward in the holder radial direction R2 than the holder axial direction tip end part 62, in either case the machined surface roughness of the machined wall face can be prevented from becoming high. This is particularly useful in cases where it is not possible to ascertain which of the holder tip end part 62 and the holder base end part 61 of the main cutting edge 6 is positioned further outward in the holder radial direction R2.

In this embodiment, the insert 2 has a bottom face 59 that abuts with a seat face 98 of the holder 1 when the insert 2 is fitted to the holder 1, and the long-side cutting edge 51 constituting the main cutting edge 6 slopes toward this bottom face 59 with progress from the holder tip end part 54 toward the holder base end part 53. That is, the insert 2 is formed in a twist shape having a twist angle α2. Accordingly, even when the degree of slope at which the seat face 98 of the holder 1 slopes with respect to the axis of rotation 9 is small, a large axial rake can be provided. In this way it is possible to lower the cutting resistance encountered by the main cutting edge 6 during cutting. And because in this embodiment a flat cutting edge extending approximately perpendicularly to the main cutting edge 6 is further provided, by the insert 2 being fitted into the holder 1 an end mill can be realized.

In this embodiment, a plurality of cutting inserts 2 are each fitted to the holder 1. Accordingly, the cutting resistance encountered by each cutting insert 2 can be reduced, and the possible depth of cut in the holder radial direction R and the holder axial direction X set for the milling tool 10, and the feed of the end mill 10 can be increased. And by the load applied to each cutting insert 2 being lowered when the depth of cut and the feed have been made large, vibration and bending of the holder 1 can be reduced and the machined surface roughness of the machined wall face after cutting can be made smoother.

Figure 19:
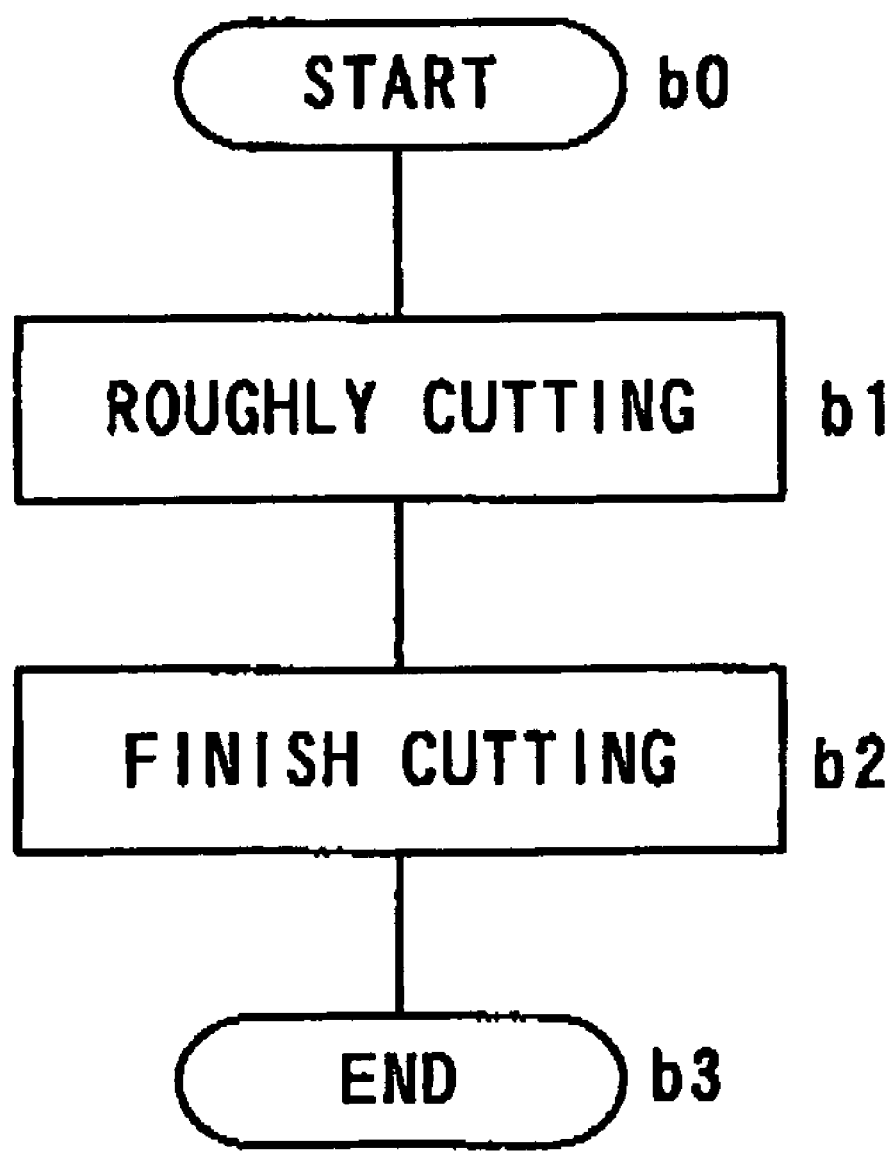
FIG. 19 is a flow chart showing a cutting procedure for when a finishing cut is carried out on a workpiece.

FIG. 19 is a flow chart showing a cutting procedure to be followed when a finishing cut is to be carried out on a workpiece. After a wall face of a workpiece 11 is cut with an end mill 10 according to the invention, the wall face of the workpiece 11 may be finish-cut with a milling tool for finishing having a main cutting edge formed integrally with its circumferential periphery.

In this case, when preparation for cutting work such as preparing the workpiece has been finished first in a step b0, in a step b1, cutting work is started. In step b1, one or multiple cutting operations are carried out with an end mill 10 incorporating an insert 2, whereby the workpiece is cut roughly, and when rough cutting is finished, the procedure moves on to step b2.

In step b2, the workpiece is finish-cut with a milling tool for finishing having a main cutting edge formed integrally with its circumferential periphery, for example a solid type end mill. And when finish cutting is complete, cutting work is ended in a step b3.

By rough cutting being carried out with an end mill 10 incorporating an insert 2 like this, even at the rough cutting stage it is possible to improve the machined surface roughness of the machined wall face after cutting. Accordingly it is possible to reduce the depth of cut at the finish cutting stage, and the cutting time of the cutting work can be shortened. And by reducing the amount of cut in the finishing cut stage, it is possible to extend the life of the milling tool for finishing.

When the depth of cut at the time of rough cutting is made large, there is a possibility of the main cutting edge 6 formed on the insert 2 breaking. In the case of that the main cutting edge 6 breaks, the sharpness of the end mill 10 can be restored by a new insert 2 being fitted to the holder 1.

Figure 20:
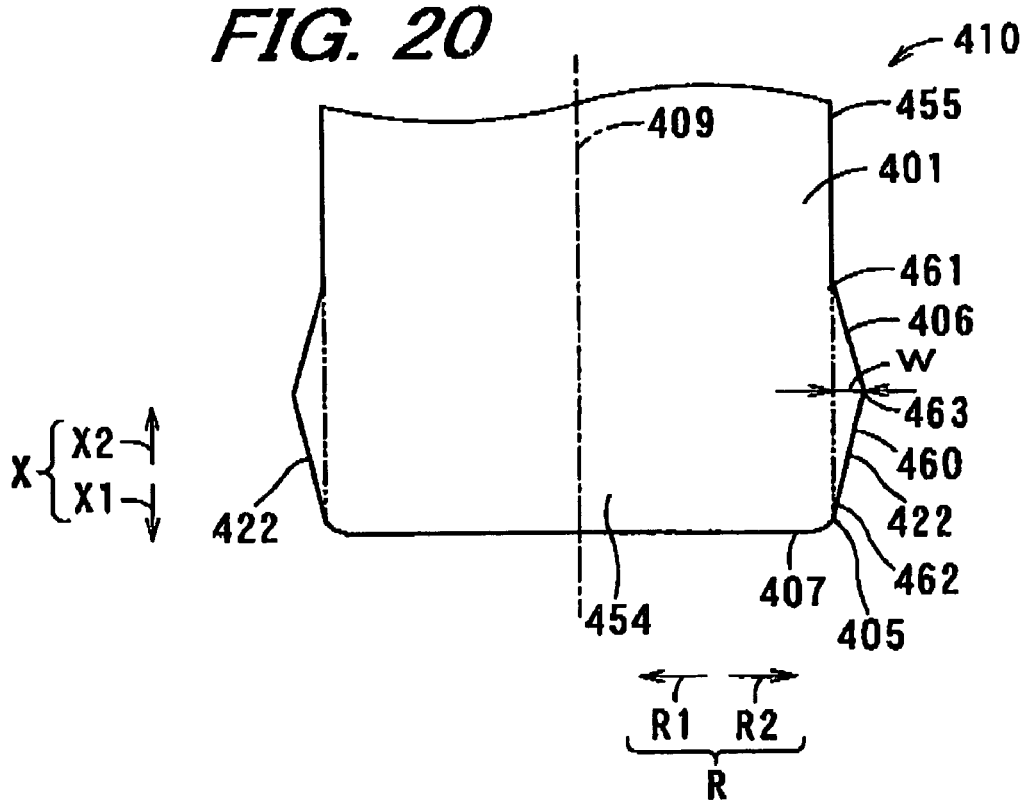
FIG. 20 is a view of a cutting insert according to a second embodiment of the invention being rotated about the axis of rotation of a holder, showing exaggerated the locus of rotation of a main cutting edge in a section parallel to its axis of rotation.

FIG. 20 is a view showing exaggerated the locus of rotation 422 of a main cutting edge 406 of an insert 402 of a second embodiment of the invention, in a cross-section parallel to the axis of rotation 409. In this second embodiment, the sectional shape of the locus of rotation 422 of the insert 402 is a shape different from an approximate circular arc. The rest of the construction is the same as that of the first embodiment and will not be described again here. Parts corresponding to parts in the first embodiment have been assigned reference numbers obtained by adding 400 to the reference numbers of the first embodiment.

In this second embodiment, the sectional shape of the locus of rotation 422 of the main cutting edge 406 slants in the outward holder radial direction R2 with progress in a straight line from a holder axial direction tip end part 462 toward a holder axial direction center part 463, and slants back in the inward holder radial direction R1 with progress in a straight line from the holder axial direction center part 463 toward a holder axial direction base end part 461.

In this case of the holder axial direction middle part 460 Of the main cutting edge 406 projecting further in the outward holder radial direction R2 than the holder axial direction base end parts 461, 462 also, the same effects as those of the first embodiment can be obtained.

Besides this the sectional shape of the locus of rotation of the main cutting edge may alternatively follow a gentle curve other than a circular arc, or may extend along a line consisting of a combination of a plurality of straight lines or curves, or may extend in a stepped shape.

Figure 21:
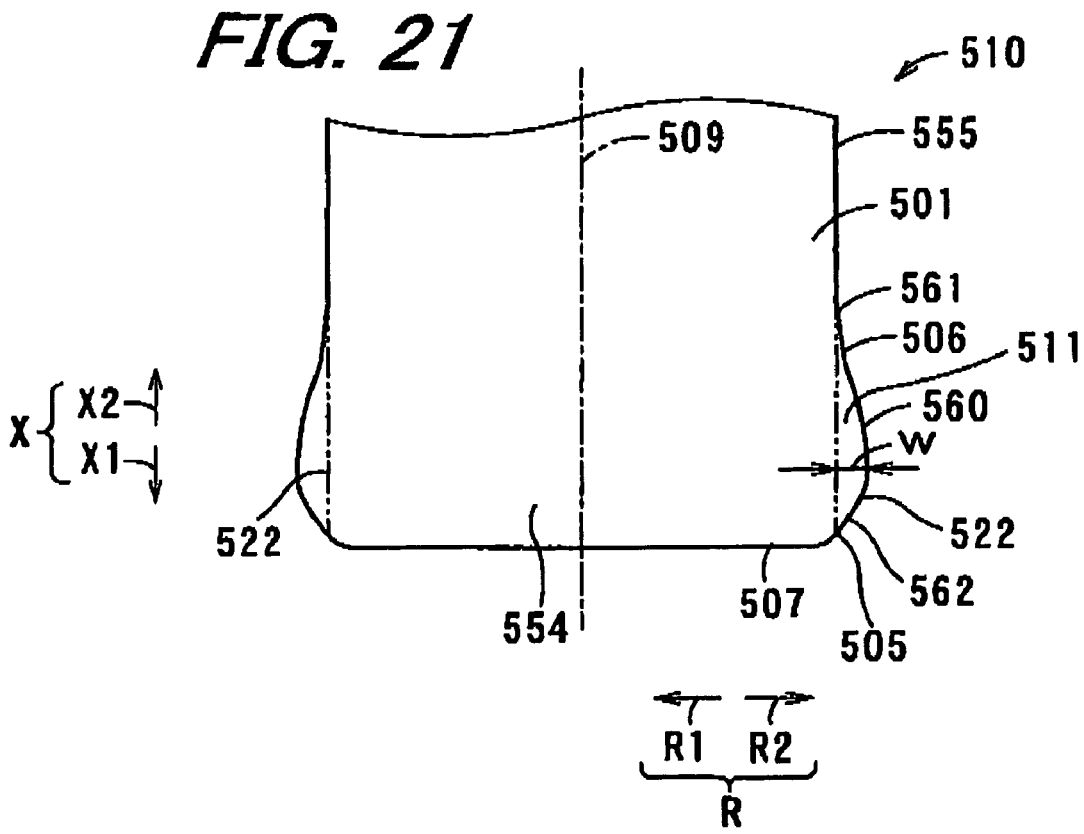
FIG. 21 is a view of a cutting insert according to a third embodiment of the invention being rotated about the axis of rotation of a holder, showing exaggerated the locus of rotation of a main cutting edge in a section parallel to its axis of rotation.

FIG. 21 is a view showing exaggerated the locus of rotation of a main cutting edge of an insert 502 of a third embodiment of the invention, in a cross-section parallel to the axis of rotation. In this third embodiment, of the locus of rotation of the main cutting edge, a holder tip end side portion 511 of the holder axial direction middle part 560 projects farthest in the outward holder radial direction R2. The rest of the construction is the same as that of the first embodiment and will not be described again here. Parts corresponding to parts in the first embodiment have been assigned reference numbers obtained by adding 500 to the reference numbers of the first embodiment.

In the third embodiment, at the location in contact with the workpiece 11, the holder axial direction base end part 561 of the main cutting edge 506 is further inward from the workpiece in the holder radial direction R than the holder axial direction tip end part 562 of the main cutting edge 506.

In the third embodiment, compared to the rest of the main cutting edge 506, a holder tip end side portion 511 of the holder axial direction middle part 560 of the main cutting edge 506 projects farthest in the outward holder radial direction R2. Consequently, even when the holder 501 bends during cutting, the projection amount by which the holder axial direction base end part 561 of the main cutting edge 506 projects beyond the holder axial direction tip end part 562 of the main cutting edge 506 in the outward holder radial direction R2 can be made small. Therefore, the affect of bending of the holder 1 can be made small, and the machined surface roughness of the machined wall face of the workpiece 11 can be improved. And it is possible to obtain the same effects as those of the first embodiment.

With this third embodiment also, preferably, in the locus of rotation 522 of the main cutting edge 506, the amount of swell w in the radial direction from the holder axial direction tip end parts 561, 562 to the holder tip end side portion 511, which, of the center part 563, projects farthest in the outward holder radial direction R2, is 0.02 mm or more and 0.06 mm or less.

Figure 22:
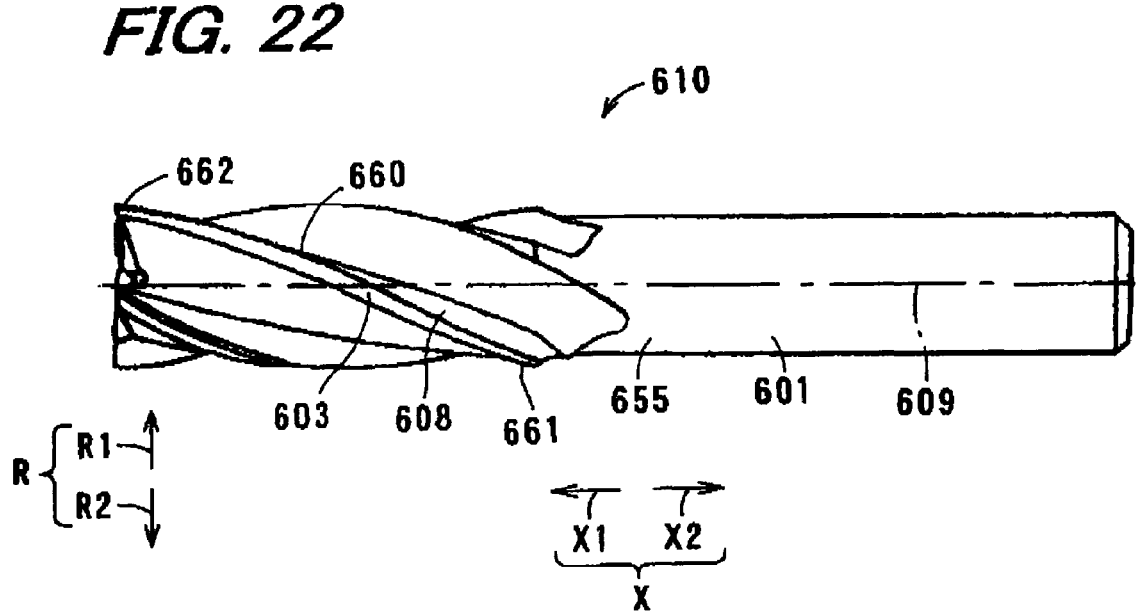
FIG. 22 is a side view showing a milling tool of a fourth embodiment of the invention.

FIG. 22 is a side view showing an end mill 610 of a fourth embodiment of the invention. In this fourth embodiment, the main cutting edge 6 described in the first embodiment is formed directly on an approximately cylindrical end mill body. That is, an insert is not used, and the main cutting edge 606 is formed integrally with the body 501.

Specifically, the end mill 610 is formed in ad approximately cylindrical shape. The end mill 610 has a flank 603 formed on its circumferential face 655, a rake face 608 cut in from the flank 603, and a main cutting edge 606 formed at the intersection ridge line where the rake face 608 and the flank 603 intersect.

When the end mill 610 is rotated about the axis of rotation 609, in the locus of rotation of the main cutting edge 606, a tool axial direction middle part 660 projects further outward in the tool radial direction than tool axial direction end parts 661, 662. Accordingly it is possible to obtain the same effects as those of the first embodiment.

Although an embodiment of the invention has been set forth above, the invention is not limited to the embodiment described here, and various changes and modifications can of course be made without deviating from the scope of the invention. Although an end mill has been described as an example of a milling tool, the effects described above can also be obtained by applying a main cutting edge according to the invention to milling tools not having a flat cutting edge, that is, to milling tools other than end mills.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A cutting insert to be fitted to a milling tool holder, comprising:
   an insert body comprising:
   an upper face comprising a rake face;
   a side face comprising a flank; and
   a main cutting edge at an intersection ridge line between the rake face and the flank,
   wherein a locus of rotation of the main cutting edge is formed when the holder is rotated around an axis of the holder with the cutting insert fitted to the circumferential periphery of the holder,
   wherein the locus of rotation comprises a middle part and end parts on both sides of the middle part in a holder axial direction parallel to the axis of the holder, the end parts comprising a tip end part and a base end part which is positioned further away from a tip of the holder in the holder axial direction than the tip end part,
   wherein the middle part projects further outward in a holder radial direction perpendicular to the holder axial direction than the end parts, and
   wherein the middle part has a farthest portion which projects farthest outward in the holder radial direction and which is closer to the tip end part in the holder axial direction than the base end part.

2. The cutting insert of claim 1, wherein a sectional shape of the locus of rotation of the main cutting edge, cut by an imaginary plane containing the axis of rotation comprises an approximate circular arc shape.

3. The cutting insert of claim 1, wherein an amount of swell w representing the difference between the largest radius in the middle part and the smallest radius in the end parts is 0.02 mm or more and 0.06 mm or less.

4. The cutting insert of claim 1,
   wherein the main cutting edge slopes from the axis of rotation of the main cutting edge so that the cutting insert has a smaller thickness at the tip end part than at the base end part.

5. The cutting insert of claim 1, wherein the insert body further comprises a corner R cutting edge which is connected to the main cutting edge,
   wherein the radius of curvature r of this corner R cutting edge is 0.4 mm or more and 4.0 mm or less.

6. The cutting insert of claim 1, wherein the insert body further comprises a flat cutting edge substantially perpendicular to the main cutting edge.

* * * * *